US 12,458,022 B2

(12) United States Patent
England et al.

(10) Patent No.: US 12,458,022 B2
(45) Date of Patent: Nov. 4, 2025

(54) METHODS AND COMPOSITIONS FOR USE IN GLUED-WOOD PRODUCTS

(71) Applicant: ARXADA AG, Visp (CH)

(72) Inventors: Kristina England, New Plymouth (NZ); Christopher Molloy, New Plymouth (NZ); Andŕe Frederik Siraa, New Plymouth (NZ)

(73) Assignee: ARXADA AG, Visp (CH)

( * ) Notice: Subject to any disclaimer, the term of this patent is extended or adjusted under 35 U.S.C. 154(b) by 337 days.

(21) Appl. No.: 17/359,865

(22) Filed: Jun. 28, 2021

(65) Prior Publication Data
US 2021/0400976 A1 Dec. 30, 2021

(30) Foreign Application Priority Data
Jun. 26, 2020 (EP) .................... 20182508

(51) Int. Cl.
A01N 47/42 (2006.01)
A01N 25/00 (2006.01)
A01N 25/10 (2006.01)
A01N 25/24 (2006.01)
A01N 43/50 (2006.01)
A01N 43/653 (2006.01)
A01N 53/00 (2006.01)
B27K 3/00 (2006.01)
B27M 1/02 (2006.01)
B27M 3/00 (2006.01)
(Continued)

(52) U.S. Cl.
CPC ............ A01N 43/50 (2013.01); A01N 25/00 (2013.01); A01N 25/10 (2013.01); A01N 25/24 (2013.01); A01N 43/653 (2013.01); A01N 47/42 (2013.01); A01N 53/00 (2013.01); B27K 3/005 (2013.01); B27M 1/02 (2013.01); B27M 3/0053 (2013.01); B27N 3/002 (2013.01); C09J 9/00 (2013.01); C09J 2400/30 (2013.01)

(58) Field of Classification Search
None
See application file for complete search history.

(56) References Cited

U.S. PATENT DOCUMENTS
2012/0071324 A1  3/2012  Uhr et al.
2016/0374340 A1  12/2016  Molloy et al.
(Continued)

FOREIGN PATENT DOCUMENTS
EP    3189952 B1 * 10/2018 ............... B27N 3/02
WO   WO-2012002826 A1 * 1/2012 ........... A01N 43/653

OTHER PUBLICATIONS
Malvern, "Basic principles of particle size analysis", https://www.atascientific.com.au/wp-content/uploads/2017/02/AN020710-Basic-Principles-Particle-Size-Analysis.pdf (Year: 2014).*
(Continued)

Primary Examiner — Dominic Lazaro
(74) Attorney, Agent, or Firm — Dority & Manning, P.A.

(57) ABSTRACT

The present invention relates to a composition for increasing the retention of a biocide in a glueline-treated glued-wood product, a method for increasing the retention of a biocide in a glueline-treated glued-wood product, a glueline-treated glued-wood product, a glue for producing a glueline-treated glued-wood product, and the use of a composition for increasing the retention of a biocide in a glued-wood product.

17 Claims, 7 Drawing Sheets

Effect of imidacloprid particle size on retentions in glueline-treated plywood after hot pressing (Hot-pressed) and after hot pressing and holding at 100°C for 24 h, 48 h, and 72 h.

(51) Int. Cl.
  *B27N 3/00*    (2006.01)
  *C09J 9/00*    (2006.01)

(56) References Cited

U.S. PATENT DOCUMENTS

2020/0215717 A1   7/2020   Schrul et al.
2023/0225313 A1   7/2023   Rowse et al.

OTHER PUBLICATIONS

International Search Report and Written Opinion for PCT/EP2021/067726 dated Sep. 8, 2021, 9 pages.
Malvern Instruments Limited, "A basic guide to particle characterization", 2015, 24 pages.
Dizaj et al., "Antimicrobial activity of the metals and metal oxide nanoparticles", Materials Science and Engineering C 44, 2014, pp. 278-284.
Horiba, Guidebook to Particle Size Analysi, 2019, 34 pages.
Ishaq et al., "Synthesis and characterization of Titanium dioxide nanoparticles against two insect pests", International Journal of Scientific and Research Publications, Val. 10, Issue 5, May 2020, 19 pages.

* cited by examiner

Figure 1. Effect of imidacloprid particle size on retentions in glueline-treated plywood after hot pressing (Hot-pressed) and after hot pressing and holding at 100°C for 24 h, 48 h, and 72 h.
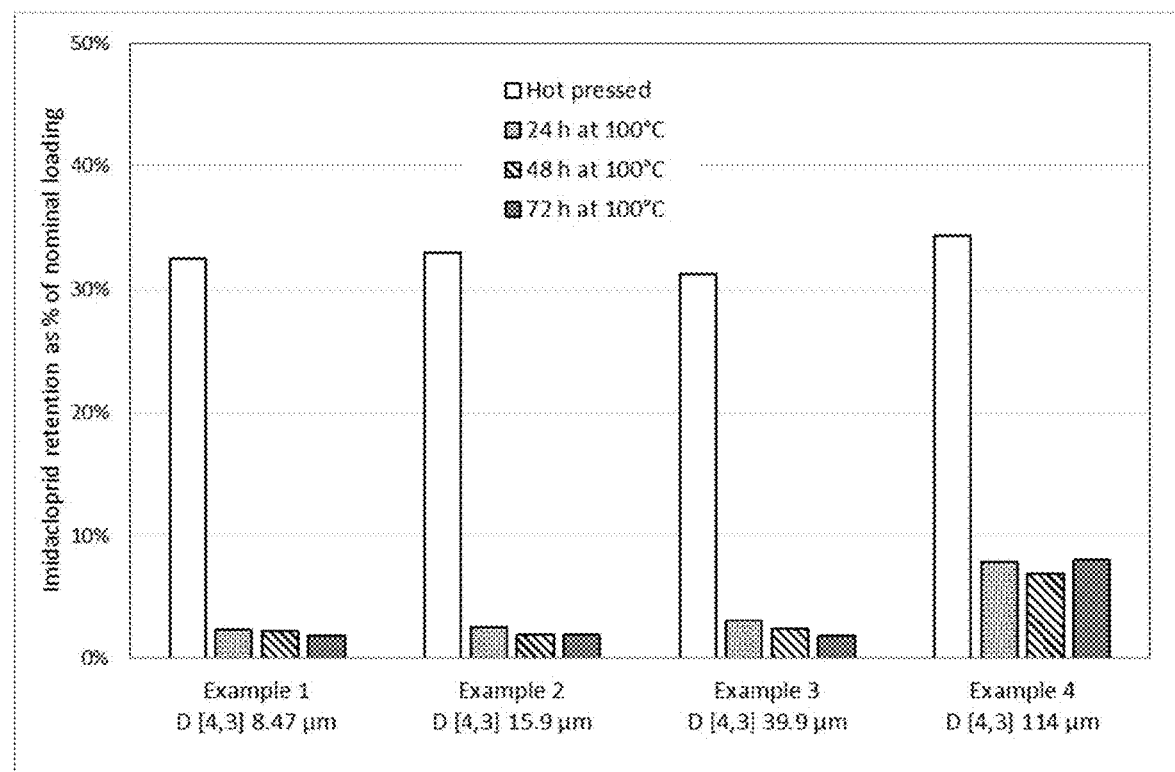

Figure 2. Effect of bifenthrin particle size on retentions in glueline-treated plywood after hot pressing (Hot pressed) and after hot pressing and holding at 100°C for 24 h and 72 h.

Figure 3. Effect of triadimefon particle size on retentions in glueline-treated plywood after hot pressing (Hot pressed) and after hot pressing and holding at 100°C for 72 h.
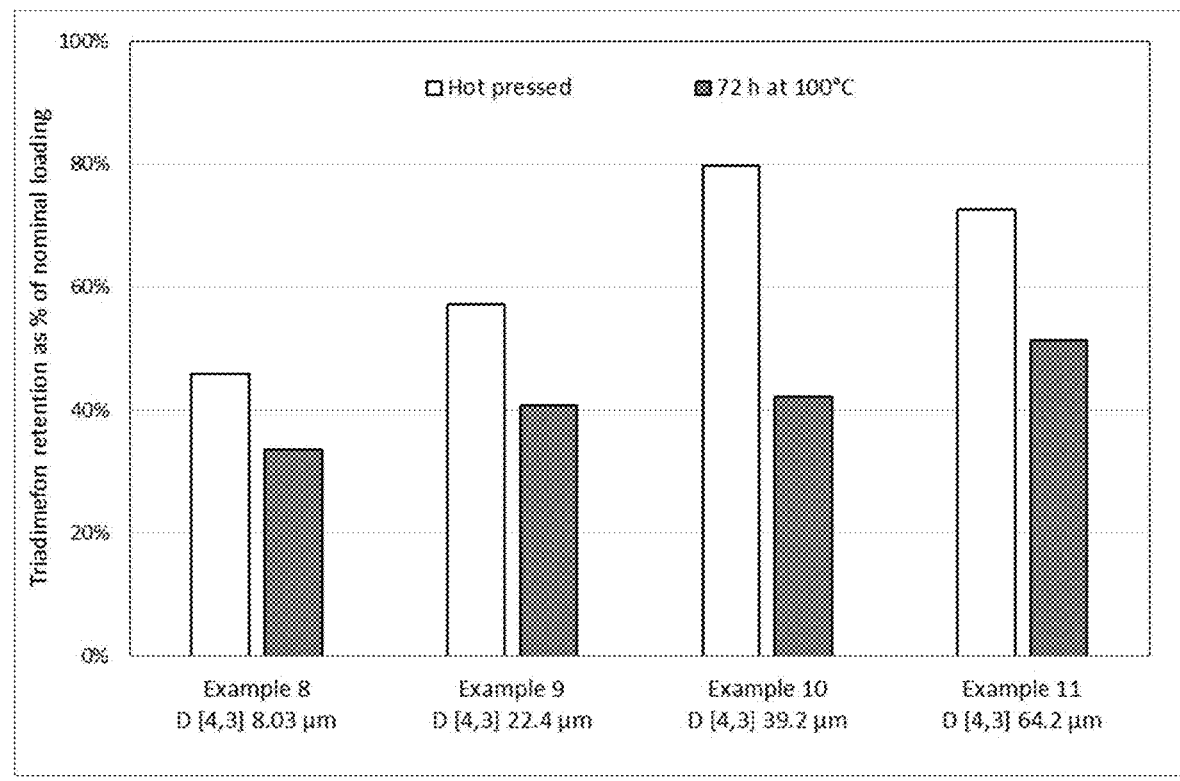

Figure 4. Effect of cyproconazole particle size on retentions in glueline-treated plywood after hot pressing (Hot pressed) and after hot pressing and holding at 100°C for 72 h.
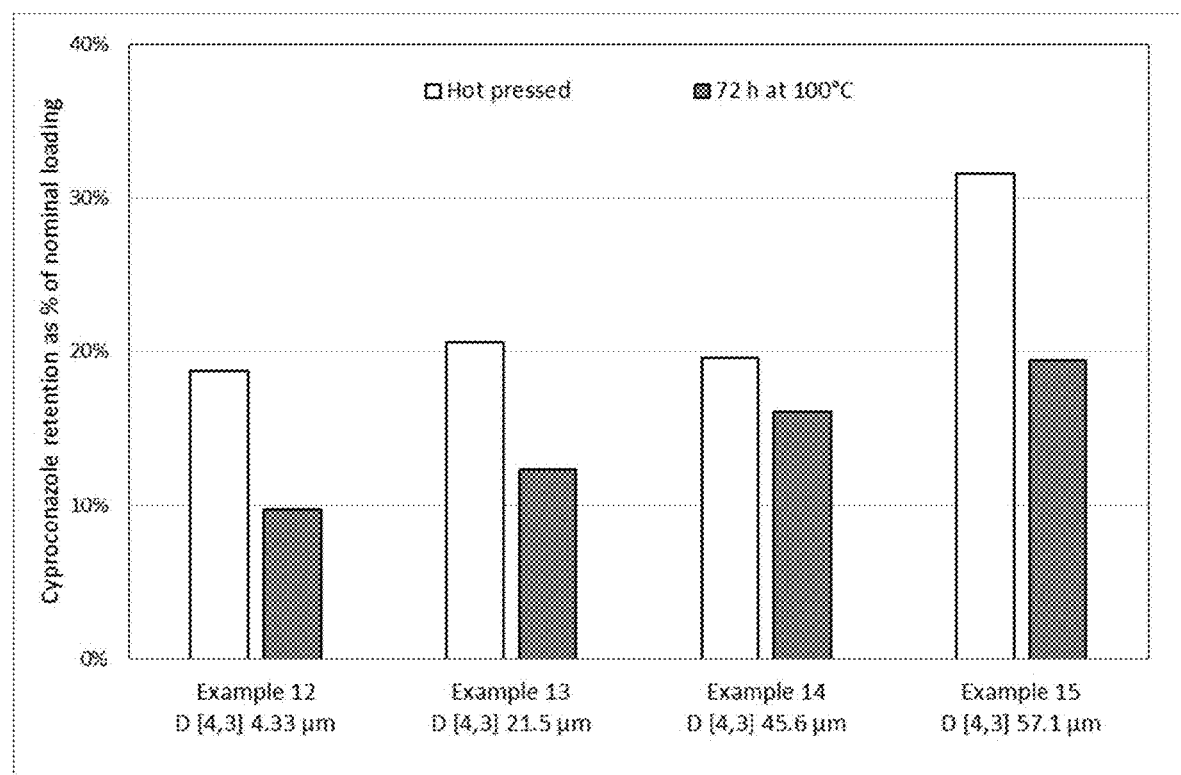

Figure 5. Effect of particle size on retentions in glueline-treated plywood after hot pressing (Hot pressed) and after hot pressing and holding at 100°C for 72 h when large particle preparations of triadimefon (Example 11) and cyproconazole (Example 15) are applied together.
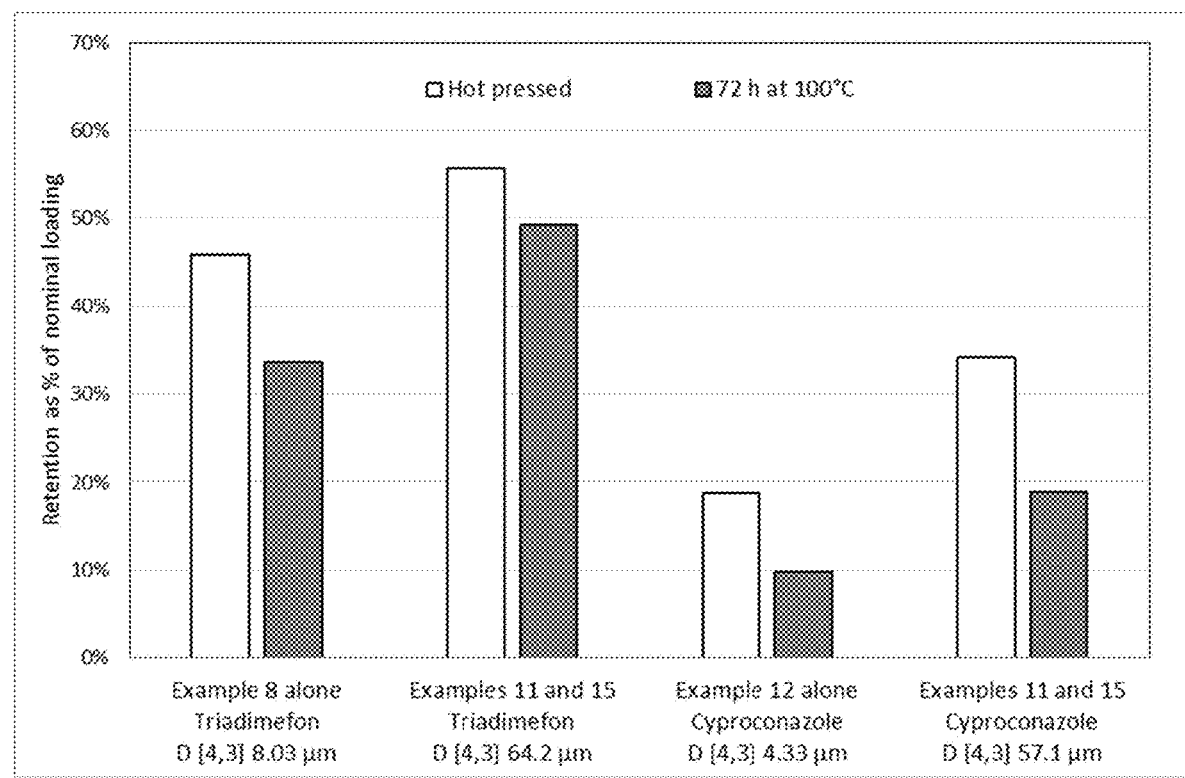

Figure 6. Effect of pyrimethanil particle size on retentions in glueline-treated plywood after hot pressing (Hot pressed) and after hot pressing and holding at 100°C for 72 h.
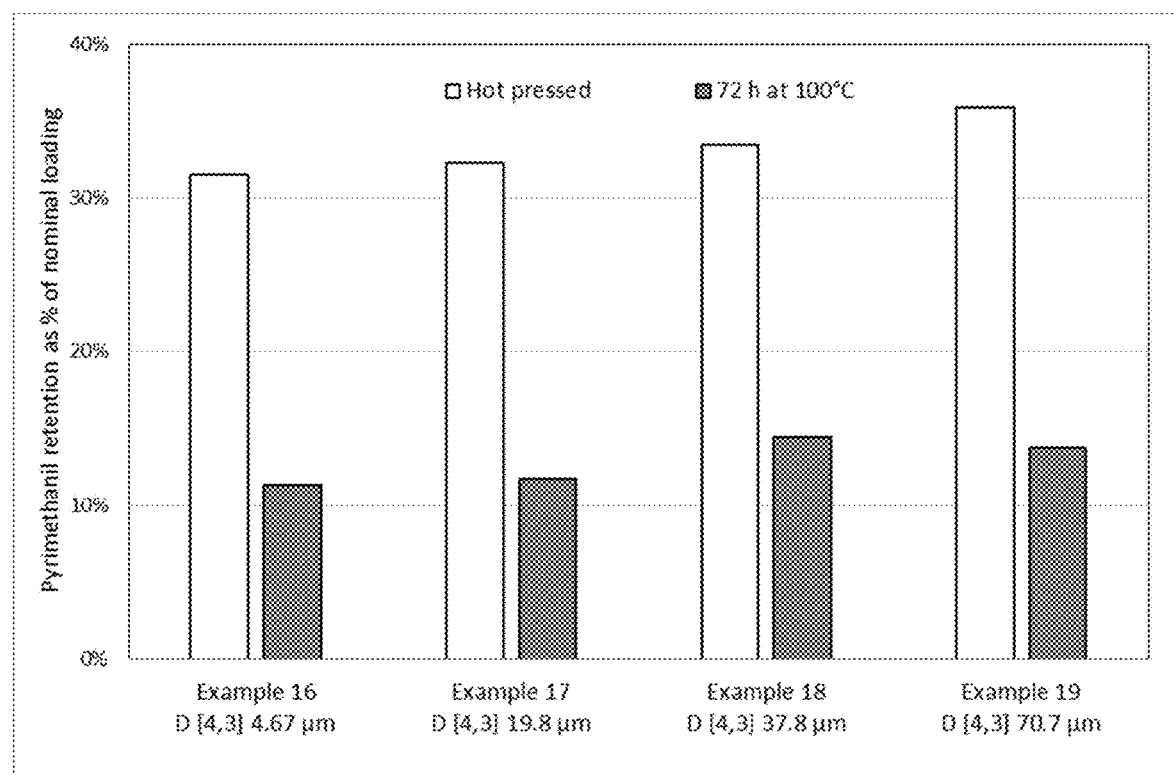

Figure 7. Effect of azoxystrobin and flutolanil particle size on retentions in glueline-treated plywood after hot pressing (Hot pressed) and after hot pressing and holding at 100°C for 72 h.

METHODS AND COMPOSITIONS FOR USE IN GLUED-WOOD PRODUCTS

CROSS REFERENCE TO RELATED APPLICATIONS

This application claims priority to European Patent Application No. 20182508.0 having a filing date of Jun. 26, 2020, which is incorporated herein by reference.

FIELD OF THE INVENTION

The present invention relates to a composition for increasing the retention of a biocide in a glueline-treated glued-wood product, a method for increasing the retention of a biocide in a glueline-treated glued-wood product, a glueline-treated glued-wood product, a glue for producing a glueline-treated glued-wood product, and the use of a composition for increasing the retention of a biocide in a glued-wood product.

BACKGROUND OF THE INVENTION

Biocides of various kinds are used to protect commercial wood products with low natural durability from degradation by insects including termites, ants, boring insects, weevils and beetles, as well as decay microorganisms, moulds and sap staining organisms. Historically wood protectants were largely based on inorganic mixtures comprising copper, chromium, arsenic, zinc, tin, boron and fluorine compounds but these are progressively being supplemented and/or replaced with more benign organic biocides in response to environmental and health concerns.

Biocide treated timber and wood products are sampled and analysed after treatment with biocides to ensure conformity to minimum biocide "retentions" required to protect the material. These minimum retentions are codified as part of country or regional "standards" or codes, which are typically based on the material treated, the nature of the threat, e.g. insect or decay, and "hazard class", a term referring to the location of the product in a building or structure and the severity of environmental challenge in service, e.g. whether the product is exposed to the weather or protected by cladding in a building. Further standards specify methods of sampling and biocide analysis, treatment methods, etc.

Biocide application methods in commercial use range from surface treatments, such as spraying and dipping, to pressure treatments involving full immersion in combination with various cycles of pressure and/or vacuum. Surface or "envelope" treatments produce limited penetration and are generally suitable for insecticides and anti-sapstain compounds, whereas pressure treatments result in partial or complete penetration depending on the wood species, the type of wood, i.e. sapwood versus heartwood, and the dimensions of the treated article. Pressure treatments are suitable for most types of biocide. Both application methods are widely used to treat sawn timber or lumber.

Similar treatment methods are possible with glued-wood products, which include glued-wood products comprising veneers such as plywood and LVL, as well as glued-wood products containing wood strands, particles, etc., such as oriented strand boards (OSB) and medium density fibreboard (MDF).

Generally, glued-wood products such as plywood and laminated veneer lumber (LVL), medium density fibreboard (MDF), oriented strand board (OSB), and the like may be surface treated with an insecticide in a minimal volume of water or organic solvent without any loss of structural integrity. Pressure treatments can be used to deliver water-borne or solvent-borne fungicides and/or insecticides to plywood and LVL but aqueous pressure treatments are generally not suitable for MDF, OSB, etc., which can break down when extensively rewetted during treatment. Surface and pressure treatments must be conducted post manufacture with associated logistical complexities and significant cost.

Another treatment option includes the delivery of wood protectants or biocides in the glues used to make these glued-wood products, also known as "glueline treatment". Glueline treatment involves applying the biocide during manufacturing operations. For example, plywood and LVL are manufactured by spreading glue onto dry rotary peeled veneers, assembling a variable number of veneers in the appropriate configuration or "layup", optionally cold pressing the layup, and then hot pressing it to compress the product to the required thickness and cure the glue. Glueline treatment of plywood and LVL involves blending the biocide into the glue before spreading thus distributing the biocide in the "gluelines" and adjacent regions of the wood component in the finished product. Glueline treatments are carried out in a similar fashion with products comprising wood flakes, strands and fibres, except there are more options for introducing the glue and the biocide depending on the particular product and its method of manufacture.

The choice of biocide for glueline addition is generally restricted to organic biocides because inorganic compounds are incompatible with most glues, with the exception of some zinc and boron compounds which are compatible with powdered glues used in some fibre and strand based products. However, hot pressing temperatures as high as 250° C. can lead to thermal degradation of organic biocides, which results in a reduction of biocide retention across a board compared to the nominal dose applied. Some glues such as isocyanate resins are highly reactive and capable of forming covalent adducts with organic biocides. Other resins may be acidic or alkaline. Heat and pressure, along with the introduction of steam (free water as reactant) in some processes, can exacerbate chemical degradation and/or sequestration of the biocide depending on the glue chemistry.

While not wishing to be bound by theory, reduced biocide retentions may result from a complex mixture of processes that may occur during production including chemical degradation of the biocide, sequestration of the biocide within the cured resin, and conversion of the biocide to other biologically active and inactive chemical forms. The relative importance of these processes is likely to differ from biocide to biocide.

Moreover, some glued-wood products are "block-stacked" post-press to retain heat to allow further glue polymerisation and promote slow cooling to obtain stable flat boards that won't bow or twist post manufacture. The centre of a typical block stack cools from in excess of 100° C. to ambient temperature over about two days whereas exterior parts cool more rapidly.

Hot press conditions generally lead to relatively uniform reductions in biocide retention across a board compared to the theoretical dose applied. Block stack conditions generally lead to further reductions that are more pronounced at the centre of the stack than the edges. The net result is that the glue must be overdosed with biocide to ensure that all parts of the board pass minimum retention requirements.

It has been proposed that some biocidal ingredients are inherently more stable to degradation during hot pressing, including the fungicide epoxiconazole (U.S. Publication No.

2012/0100361), and the insecticides thiacloprid (U.S. Pat. No. 8,114,425) and bifenthrin (AU Patent No. 2003266461).

Formulation types in current use for glueline treatment with biocides (including the above) include micro emulsions (ME), emulsion concentrates (EC), suspension concentrates (SC) and wettable powders (WP) as disclosed in AU Patent No. 2003266461 or capsule suspensions (CS) as disclosed in AU Patent No. 2006220419. Further formulation types are described in US publication 2012/0100361 as an oil solution, an emulsion, a solubilizer, a wettable powder, a suspension, a flowable formulation and a dust formulation.

An emulsifiable concentrate (EC) contains an active ingredient dissolved in a substantially water-immiscible solvent together with suitable emulsifiers such that when the EC is dispersed into an aqueous medium the active ingredient is contained within the resulting organic phase droplets, which are generally less than about 2 μm in diameter. Likewise, a micro-emulsion (ME) contains an active ingredient dissolved in a substantially water-immiscible solvent together with suitable emulsifiers, dispersed within water "in the can" as very small, thermodynamically stable droplets, generally less than about 0.5 μm in diameter and as small as 0.1 μm in diameter.

A suspension concentrate (SC) contains a suspension in water of active ingredient particles milled to an average or mean particle size, which is more precisely expressed as a D [4,3] value (defined below), in the range of about 1-10 μm, generally less than about 5 μm. The actives are thus milled to increase the surface area of active ingredient on sprayed leaves when sprayed on plants, for example, to facilitate suspension and reduce settling in water, and to minimise the propensity for Oswald ripening whereby crystal growth increases active ingredient particle sizes over time and reduces formulation stability.

Active ingredients in other solid formulation types including wettable powders, water dispersible granules and other types of granule are micronized to a D [4,3]<10 μm, generally about 5 μm, in order to maximise the surface area of active ingredient on sprayed leaves, etc., and to facilitate dispersion of the active ingredient when diluted into water before use.

None of the above formulation types or biocide presentations provide any solution to the problem of significantly reduced biocide retentions in glued-wood products after hot pressing, in particular after hot pressing and block stacking during manufacture.

There is a need to provide compositions and methods for glueline preservation of glued-wood products wherein the biocide is more resistant to degradation, inactivation and/or sequestration during the manufacturing process. Degradation, inactivation and/or sequestration of the biocide during the manufacturing process leads to a decrease of biocide retention in the glued-wood product as well as uneven biocide retentions in different regions of the glued-wood product. This is particularly important after hot pressing and block stacking.

A desired feature of the present invention is therefore to overcome the problems as discussed, or at least to provide the public with a useful choice.

The present invention provides a solution to this problem by providing biocide compositions that achieve high retentions of the biocide in a glueline-treated glued-wood product after hot-pressing and in particular after hot pressing and block-stacking. Such high retentions cannot be achieved with the known biocide formulations.

A further advantage is that the biocide composition is useful in increasing the retention of a biocide in a glue or native resin in glueline treatment of a glued-wood product that has been hot-pressed and in particular hot-pressed and block-stacked during manufacture. A further advantage is that the biocide is more efficacious.

Any discussion of the prior art throughout the specification should in no way be considered as an admission that such prior art is widely known or forms part of the common general knowledge in the field. All references cited in this specification are incorporated by reference in their entirety.

SUMMARY OF THE INVENTION

In one aspect, the present invention provides a composition for increasing the retention of a biocide in a glueline-treated glued-wood product that has been hot-pressed and in particular hot-pressed and block-stacked during manufacture comprising particles of at least one biocide, wherein said particles have a volume mean diameter D [4,3] of at least about 20 μm.

In one embodiment, the at least one biocide is independently selected from an insecticide, a fungicide, and combinations thereof.

In one embodiment the at least one biocide is independently selected from the group consisting of a neonicotinoid, a synthetic pyrethroid, a phenylpyrazole, an azole, an anilinopyrimidine fungicides, a quinone outside inhibitor fungicide, a phenyl-benzamide, or any combination thereof, wherein said biocide has a volume mean diameter of D [4,3] of at least about 20 μm.

In one embodiment the at least one biocide is independently selected from the group consisting of imidacloprid, bifenthrin, fipronil, triadimefon, cyproconazole, pyrimethanil, azoxystrobin, flutolanil, or any combination thereof, wherein said biocide has a volume mean diameter of D [4,3] of at least about 20 μm.

In one embodiment the at least one biocide is independently selected from the group consisting of imidacloprid, bifenthrin, or any combination thereof, wherein said biocide has a volume mean diameter of D [4,3] of at least about 20 μm.

In one embodiment the at least one biocide is independently selected from the group consisting of imidacloprid, bifenthrin, fipronil, triadimefon, cyproconazole, pyrimethanil, azoxystrobin, flutolanil, or any combination thereof, wherein said biocide has a volume mean diameter of D [4,3] of at least about 30 μm.

In one embodiment the at least one biocide is independently selected from the group consisting of imidacloprid, bifenthrin, or any combination thereof, wherein said biocide has a volume mean diameter of D [4,3] of at least about 30 μm.

In one embodiment the biocide is imidacloprid, wherein said biocide has a volume mean diameter of D [4,3] of at least about 20 μm.

In one embodiment the biocide is bifenthrin, wherein said biocide has a volume mean diameter of D [4,3] of at least about 20 μm.

In one embodiment the biocide is imidacloprid, wherein said biocide has a volume mean diameter of D [4,3] of at least about 30 μm.

In one embodiment the biocide is bifenthrin, wherein said biocide has a volume mean diameter of D [4,3] of at least about 30 μm.

In one embodiment, the particles have a volume mean diameter D [4,3] of at least about 20 μm.

In one embodiment, said particles have a volume mean diameter D [4,3] of at least about 25 μm.

In one embodiment, said particles have a volume mean diameter D [4,3] of at least about 30 μm.

In one embodiment, the particles have a volume weighted percentile Dv90 of about 400 μm or less, preferably of about 300 μm or less.

In one embodiment, the composition according to the invention comprises about 1 to 99% of biocide particles by weight, preferably about 2 to 97% of biocide particles by weight, more preferably about 3 to 95% of biocide particles by weight, based on the total weight of the composition.

In one aspect, the present invention provides a composition for increasing the retention of a biocide in a glueline-treated glued-wood product that has been hot-pressed and in particular hot-pressed and block-stacked during manufacture comprising particles of at least one biocide,
- wherein the at least one biocide is independently selected from the group consisting of a neonicotinoid, a synthetic pyrethroid, a phenylpyrazole, an azole, an anilinopyrimidine fungicides, a quinone outside inhibitor fungicide, a phenyl-benzamide, or any combination thereof,
- wherein said biocide has a volume mean diameter of D [4,3] of at least about 20 μm, and
- wherein said composition comprises about 1 to 99% of biocide particles by weight, preferably about 2 to 97% of biocide particles by weight, more preferably about 3 to 95% of biocide particles by weight, based on the total weight of the composition.

In one aspect, the present invention provides a composition for increasing the retention of a biocide in a glueline-treated glued-wood product that has been hot-pressed and in particular hot-pressed and block-stacked during manufacture comprising particles of at least one biocide,
- wherein the at least one biocide is independently selected from the group consisting of a neonicotinoid, a synthetic pyrethroid, a phenylpyrazole, an azole, an anilinopyrimidine fungicides, a quinone outside inhibitor fungicide, a phenyl-benzamide, or any combination thereof,
- wherein said biocide has a volume mean diameter of D [4,3] of at least about 30 μm, and
- wherein said composition comprises about 1 to 99% of biocide particles by weight, preferably about 2 to 97% of biocide particles by weight, more preferably about 3 to 95% of biocide particles by weight, based on the total weight of the composition.

In one embodiment, the glueline-treated glued-wood product is selected from engineered wood products, glued-wood veneers, plywood, LVL, reconstituted wood-based products including glued-wood flakes, chips, strands, particles, fibres, flour, dusts and nanofibrils, flakeboard, chipboard, strandboard, OSB, parallel strand lumber, particleboard, MDF, high density fibreboard and hardboard.

In one embodiment, the glueline-treated glued-wood product is selected from glued-veneer products including plywood and LVL.

In one embodiment, the composition according to the invention is formulated suitable for glue addition, preferably as a suspension in water and/or one or more water-miscible non-solvent liquids.

In another aspect, the present invention provides a method for increasing the retention of a biocide in a glueline-treated glued-wood product that has been hot-pressed or hot-pressed and block-stacked during manufacture comprising applying a composition according to the present invention to the glueline during the production of said product.

In another aspect, the present invention provides a glued wood-product comprising two or more wood veneers, a phenolic resin and a biocidal composition comprising particles of at least one biocide wherein said particles have a volume mean diameter D[4,3] of at least about 20 μm, and wherein the glued veneer product is hot pressed and in particular hot pressed and block stacked during manufacture.

In another aspect, the present invention provides a glued wood-product comprising two or more wood veneers, a phenolic resin and a biocidal composition comprising particles of at least one biocide wherein said particles have a volume mean diameter D[4,3] of at least about 20 μm, and wherein the glued veneer product is hot pressed and in particular hot pressed and block stacked during manufacture,
- wherein the at least one biocide is independently selected from the group consisting of a neonicotinoid, a synthetic pyrethroid, a phenylpyrazole, an azole, an anilinopyrimidine fungicides, a quinone outside inhibitor fungicide, a phenyl-benzamide, or any combination thereof.

In another aspect, the present invention provides a glued wood-product comprising two or more wood veneers, a phenolic resin and a biocidal composition comprising particles of at least one biocide wherein said particles have a volume mean diameter D[4,3] of at least about 20 μm, and wherein the glued veneer product is hot pressed and in particular hot pressed and block stacked during manufacture,
- wherein said phenolic resin is independently selected from the group consisting of novolac-type and resole-type phenol-formaldehyde (PF) resins, resorcinol-formaldehyde resins, phenol-resorcinol-formaldehyde resins, or a combination thereof, and
- wherein the at least one biocide is independently selected from the group consisting of a neonicotinoid, a synthetic pyrethroid, a phenylpyrazole, an azole, an anilinopyrimidine fungicides, a quinone outside inhibitor fungicide, a phenyl-benzamide, or any combination thereof.

In another aspect, the present invention provides a glued wood-product comprising two or more wood veneers, a phenolic resin and a biocidal composition comprising particles of at least one biocide wherein said particles have a volume mean diameter D[4,3] of at least about 20 μm,
- wherein the glued veneer product is hot pressed and in particular hot pressed and block stacked during manufacture,
- wherein the at least one biocide is independently selected from the group consisting of imidacloprid, bifenthrin, fipronil, triadimefon, cyproconazole, pyrimethanil, azoxystrobin, flutolanil, or any combination thereof.

In one embodiment, applying an inventive composition to the glueline during the production of said product comprises blending said composition directly into the glue at any time from glue production to use during manufacture of the glued-wood product.

In one embodiment, applying an inventive composition to the glueline during the production of said product comprises applying said composition indirectly to the glue by applying said composition to the wood component prior to, at the same time as, or after introduction of the glue during manufacture of the glued-wood product.

In another aspect, the present invention provides a glueline-treated glued-wood product comprising the composition according to the present invention.

In another aspect, the present invention provides a glueline-treated glued-wood product manufactured according to the method according to the present invention.

In another aspect, the present invention provides a glue for producing a glueline-treated glued-wood product comprising the composition according to the present invention.

In one embodiment, the glue is selected from phenolic resins including novolac-type and resole-type phenol-formaldehyde (PF) resins, resorcinol-formaldehyde resins and phenol-resorcinol-formaldehyde resins, amino resins including hydroxymethyl or alkoxymethyl derivatives of urea, chiefly urea-formaldehyde, melamine, benzoguanamine, glycoluril, urea-formaldehyde, melamine-formaldehyde, melamine-urea formaldehyde resins, isocyanate resins including isocyanate resins based on (partially) polymerised diisocyanates, mainly polymeric diphenylmethane diisocyanate (pMDI), thermoset epoxy and polyurethane resins, PVAs, and adhesives based on biomaterials including proteins, starches and lignocellulosic extractives including lignins.

In one embodiment, the glue is selected from phenolic resins including novolac-type and resole-type phenol-formaldehyde (PF) resins, resorcinol-formaldehyde resins and phenol-resorcinol-formaldehyde resins.

In another aspect, the present invention provides the use of a composition according to the present invention for increasing the retention of a biocide in a glued-wood product comprising a glue or native resin, wherein the glued-wood product has been hot-pressed or hot-pressed and block-stacked during manufacture, and wherein the composition is applied to the glue or the native resin.

In another aspect, the present invention provides a glued wood-product comprising two or more wood veneers, a phenolic resin and a biocidal composition comprising particles of at least one biocide,
- wherein the at least one biocide is independently selected from the group consisting of a neonicotinoid, a synthetic pyrethroid, a phenylpyrazole, an azole, an anilinopyrimidine fungicides, a quinone outside inhibitor fungicide, a phenyl-benzamide, or any combination thereof,
- wherein said biocide has a volume mean diameter D[4,3] of at least about 20 μm,
- wherein said glued wood product is a glued veneer product that is hot pressed and in particular hot pressed and block stacked during manufacture,
- wherein said phenolic resin is independently selected from the group consisting of novolac-type and resole-type phenol-formaldehyde (PF) resins, resorcinol-formaldehyde resins, phenol-resorcinol-formaldehyde resins, or a combination thereof, and
- wherein said composition comprises about 1 to 99% of biocide particles by weight, preferably about 2 to 97% of biocide particles by weight, more preferably about 3 to 95% of biocide particles by weight, based on the total weight of the composition.

BRIEF DESCRIPTION OF THE DRAWINGS

FIG. 1 illustrates the effect of imidacloprid particle size within a suspension concentrate on retentions in glueline-treated plywood after hot pressing and after holding at 100° C. for 24 hours, 48 hours and 72 hours.

FIG. 2 illustrates the effect of bifenthrin particle size on retentions in glueline-treated plywood after hot pressing and after holding at 100° C. for 24 hours and 72 hours.

FIG. 3 illustrates the effect of triadimefon particle size on retentions in glueline-treated plywood after hot pressing and after holding at 100° C. for 72 hours.

FIG. 4 illustrates the effect of cyproconazole particle size on retentions in glueline-treated plywood after hot pressing and after holding at 100° C. for 72 hours.

FIG. 5 illustrates the effect of particle size on retentions in glueline-treated plywood after hot pressing and after holding at 100° C. for 72 hours when large particle preparations of triadimefon and cyproconazole are applied together.

FIG. 6 illustrates the effect of pyrimethanil particle size on retentions in glueline-treated plywood after hot pressing and after holding at 100° C. for 72 hours.

FIG. 7 illustrates the effect of azoxystrobin and flutolanil particle size on retentions in glueline-treated plywood after hot pressing and after holding at 100° C. for 72 hours.

DEFINITIONS

As used herein, the terms "about," "approximately," or "generally," when used to modify a value, indicates that the value can be raised or lowered by 10% and remains within the disclosed embodiment.

The term "retention" as used in this disclosure refers to the concentration of biocide active ingredient extracted from the finished glued-wood product and measured by an analytical procedure. Terms such as "active ingredient retention", "preservative retention", "insecticide retention" or "fungicide retention" are often used in the art. Retentions are typically expressed as grams of active ingredient per cubic metre of dried wood product (gai/m$^3$) or mass of active ingredient/mass of dried wood product (% m/m). When a glued-wood product is treated with two or more active ingredients, e.g. one or two fungicidal ingredients and an insecticide, the retention of each ingredient is measured. When comparing different biocide formulations, it is also convenient to express biocide retentions as a percentage of the nominal biocide loading or application rate and use the term "recovery", i.e. how much of the dose applied was recovered at the completion of manufacture.

The term "biocide" as used herein refers to at least one active ingredient preferably selected from insecticides and fungicides.

The term "biocide technical" refers to the active ingredient as it is received from the manufacturer and is used to make a formulation of the biocide. The term "technical" is applied to individual insecticides and fungicides herein. The terms "technical" and "tech" are used interchangeably herein.

The term "glued-wood product" as used herein refers to glued-wood products whose production includes at least a glue addition step, a hot pressing step and, optionally, a block stacking step. Glued-wood products include glued veneer products (sometimes called engineered wood products) such as plywood and LVL, products comprising glued-wood flakes, chips, strands, particles, fibres, flour, dusts or nanofibrils (sometimes called reconstituted wood-based products) such as flake boards, chip boards, strand boards, oriented strand boards (OSB), parallel strand lumber, particle board, medium density fibreboard (MDF), high density fibreboard, hard board, etc., and products containing combinations of different layers such as glued strands and glued fibres within the one product. Glued lignocellulosic products based on bamboo, rattan, bagasse, straw, hemp, jute sticks, flax shives and the like are also included within the definition of glued-wood product.

The term "glue" as used herein refers to the non-wood component of the glued-wood product that adheres or bonds the wood components to produce a mechanically stable finished product. The term glue includes "native resins" such as isocyanate resins like polymeric diphenylmethane diisocyanate (pMDI), which can be used as is. Generally native resins are not single chemicals but rather a plurality of chemicals or different polymeric forms resulting from the syntheses in commercial use. Apart from isocyanates, most native resins can be used in combination with water, wetting agents, fillers, catalysts, etc., and such mixtures are referred to as a "glue", "glue mixture" or a "glue mix" in the art and throughout this disclosure. Notwithstanding this distinction, the term "glue" encompasses all forms of adhesive used in the manufacture of hot-pressed or hot-pressed and block-stacked glued-wood products.

The term "glueline treatment" as used herein refers to the delivery of the biocide to a glued-wood product via the glueline, either by direct addition whereby the biocide is added to the glue component before it meets the wood component or by indirect addition whereby the biocide is added to the wood component before, during or after the wood meets the glue. Glueline treatment is distinct from pressure treatment of wood components before manufacture or pressure treatment of a glued-wood product after manufacture.

The term "hot pressing" as used herein refers to the application of heat and mechanical pressure to compress the assembled constituents of a glued wood products into its final form and to cure or set the glue. The equipment used is called a hot press. The term "hot pressed" and "hot-pressing" are used interchangeably.

The term "block-stacked" as used herein refers to a common process applied in the manufacturing of glued-wood products. The glued-wood products are stacked post-press to retain heat to allow further glue polymerisation and promote slow cooling to obtain stable flat boards that won't bow or twist post manufacture. The term "block stacked" and "block-stacking" are used interchangeably.

The terms "hot pressed and block-stacked" and "simulated block stacking" are used interchangeably.

The term "particle" as used herein refers to a discrete sub-portion of a substance, wherein the substance is a biocidal active ingredient and the substance is in a solid physical state. The terms "particle", "particles", "particulates" and "particulate form" are used interchangeably.

The particle size measurement "D [4,3]" as used herein refers to the Volume Moment Mean (De Brouckere Mean Diameter), sometimes referred to as Volume Mean Diameter, a value that reflects the size of particles when treated as equivalent spheres, and is indicative of the size of those particles which constitute the bulk of the sample volume.

The particle size measurement "Dv90" as used herein refers to the maximum particle diameter below which 90% of the sample volume exists. Other equivalent values can be used, e.g. Dv50 and Dv10 referring to 50% or 10% of the sample volume. These parameters are known as volume weighted percentiles.

D [4,3] and Dv90 values as used herein are defined as those values determined by laser diffraction in water using the following parameters: Particle Refractive Index, 1.596, Particle Absorption Index, 0.010; Dispersant Refractive Index, 1.330; Scattering Model, Mie.

Methods of determining the particle size are commonly known. An introduction to particle size measurements and the abovementioned values is provided in the technical document "A basic guide to particle characterisation", published by Malvern Instruments Limited in 2015, and incorporated herein.

DETAILED DESCRIPTION OF THE INVENTION

Composition

The various aspects of the invention each include at least one biocide in particulate form wherein the biocide particles have a D [4,3] of at least about 20 μm.

The invention provides a composition for increasing the retention of a biocide in a glueline-treated glued-wood product that has been hot-pressed or hot-pressed and block-stacked during manufacture, comprising particles of at least one biocide, wherein said particles have a volume mean diameter D [4,3] of at least about 20 μm.

The invention further provides a method for increasing the retention of a biocide in a glueline-treated glued-wood product that has been hot-pressed or hot-pressed and block-stacked during manufacture, the method including applying the biocide to the glueline of the said product in the form of a composition according to the present invention.

The invention further provides a glueline-treated glued-wood product having increased and more consistent biocide retentions when hot-pressed or hot-pressed and block stacked during manufacture, the glueline of the said product comprising particles of at least one biocide, wherein said particles have a volume mean diameter D [4,3] of at least about 20 μm.

Surprisingly, the inventors have found that particles of a biocide active ingredient having a D [4,3] of at least about 20 μm produce an increased biocide retention when used applied in glueline treatment of a glued-wood product compared to conventional wood protectant compositions when the glued-wood product is hot-pressed or hot-pressed and block-stacked.

Furthermore, more consistent biocide retentions may be obtained in different regions of hot-pressed or hot-pressed and block-stacked glued-wood products. Accordingly, biocide application amounts or loadings may be reduced.

In one embodiment, the at least one biocide is independently selected from an insecticide, a fungicide, and combinations thereof. Suitable insecticides and fungicides are known to the skilled artisan, such as for example the following.

Insecticides

The following insecticides grouped by mode of action according to the Insecticide Resistance Action Committee (IRAC) are suitable for the invention.

GABA-gated chloride channel blockers comprising phenylpyrazoles (IRAC code 2B) including acetoprole, ethiprole, fipronil, flufiprole, pyrafluprole, pyriprole, vaniliprole.

Sodium channel modulators comprising pyrethroids (IRAC code 3A) including acrinathrin, allethrin, bifenthrin, chloroprallethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin, deltamethrin, dimefluthrin, esfenvalerate, etofenprox, fenpropathrin, fenvalerate, esfenvalerate, flucythrinate, flumethrin, fluvalinate, tau-fluvalinate, halfenprox, imiprothrin, kadethrin, metofluthrin, permethrin, phenothrin, prallethrin, profluthrin, protrifenbute, pyrethrins I and II, resmethrin, silafluofen, tefluthrin, tetramethrin, tralomethrin, transfluthrin, valerate, and enantiomers thereof.

Nicotinic acetylcholine receptor (nAChR) competitive modulators comprising neonicotinoids (IRAC code 4A) including acetamiprid, clothianidin, dinotefuran, imidacloprid, imidaclothiz, nitenpyram, nithiazine, paichongding, thiacloprid and thiamethoxam; and other (nAChR) competitive modulators (IRAC codes 4A-4E) including nicotine, sulfoxaflor, flupyradifurone and triflumezopyrim.

nAChR Allosteric modulators (IRAC code 5) including spinetoram, spinosad.

Glutamate-gated chloride channel allosteric modulators (IRAC code 6) including abamectin, emamectin benzoate, lepimectin and milbemectin Juvenile hormone mimics (IRAC code 7) including hydroprene, kinoprene, methoprene, fenoxycarb and pyriproxyfen.

Chordotonal organ TRPV channel modulators (IRAC code 9B) including pymetrozine and pyrifluquinazon and (IRAC code 9D) including afidopyropen.

Mite growth inhibitors (IRAC code 10) including clofentezine, diflovidazin, hexythiazox and etoxazole.

Inhibitors of mitochondrial ATP synthase (IRAC code 12) including diafenthiuron, azocyclotin, cyhexatin, fenbutatin oxide, propargite, and tetradifon.

Uncouplers of oxidative phosphorylation (IRAC code 13) including chlorfenapyr, DNOC and sulfluramid.

nAChR Channel blockers (IRAC code 14) including bensultap, cartap hydrochloride, thiocyclam and thiosultap-sodium Inhibitors of chitin biosynthesis, type 0 (IRAC code 15) including bistrifluron, chlorfluazuron, diflubenzuron, flucycloxuron, flufenoxuron, hexaflumuron, lufenuron, novaluron, noviflumuron, teflubenzuron, and triflumuron; and type 1 (IRAC code 16) including buprofezin.

Ecdysone receptor agonists (IRAC code 18) including chromafenozide, halofenozide, methoxyfenozide and tebufenozide.

Octopamine receptor agonists (IRAC code 19) including amitraz.

Mitochondrial complex III electron transport inhibitors (IRAC code 20) including hydramethylnon, acequinocyl, fluacrypyrim and bifenazate.

Mitochondrial complex I electron transport inhibitors (IRAC code 21) including fenazaquin, fenpyroximate, pyridaben, pyrimidifen, tebufenpyrad, tolfenpyrad and rotenone.

Voltage-dependent sodium channel blockers (IRAC code 22) including indoxacarb and metaflumizone.

Inhibitors of acetyl CoA carboxylase (IRAC code 23) including spirodiclofen, spiromesifen, spiropidion and spirotetramat.

Mitochondrial complex II electron transport inhibitors (IRAC code 24) including cyenopyrafen, cyflumetofen and pyflubumide.

Ryanodine receptor modulators (IRAC code 28) including chlorantraniliprole, cyantraniliprole, cyclaniliprole, flubendiamide and tetraniliprole.

Chordotonal organ modulators (IRAC code 29) including flonicamid.

GABA-gated chloride channel allosteric modulators (IRAC code 30) including broflanilide, fluxametamide and isocycloseram.

Also included are insecticides of unknown or uncertain mode of action including acynonapyr, benzpyrimoxan, cyhalodiamide, dimpropyridaz, oxazosulfyl and pyridalyl.

The insecticides used in the composition of the present invention are known and include but are not limited to, for example GABA-gated chloride channel blockers comprising phenylpyrazoles, sodium channel modulators comprising pyrethroids and nicotinic acetylcholine receptor (nAChR) competitive modulators comprising neonicotinoids.

In one embodiment, the insecticide can be independently selected from the group consisting of phenylpyrazoles, pyrethroids and neonicotinoids.

In one embodiment, the at least one biocide may comprise a GABA-gated chloride channel blocker comprising a phenylpyrazole.

The phenylpyrazole compounds used in the composition of the present invention are known and include but are not limited to, for example acetoprole, ethiprole (5-amino-1-[2, 6-dichloro-4-(trifluoromethyl)phenyl]-4-(ethylsulfinyl)-1H-pyrazole-3-carbonitrile), fipronil (5-amino-1-[2,6-dichloro-4-(trifluoromethyl)phenyl]-4-[(trifluoromethyl)sulfinyl]-1H-pyrazole-3-carbonitrile), flufiprole, pyrafluprole, pyriprole, and vaniliprole.

In one embodiment, the phenylpyrazole can be independently selected from the group consisting of ethiprole and fipronil, or a combination thereof.

In one embodiment, the phenylpyrazole may be fipronil.

In one embodiment, the at least one biocide may comprise a sodium channel modulators comprising a pyrethroid.

The pyrethroid compounds used in the composition of the present invention are known and include but are not limited to, for example acrinathrin, allethrin, bifenthrin ((2-methyl [1,1'-biphenyl]-3-yl)methyl (1R,3R)-rel-3-[(1Z)-2-chloro-3, 3,3-trifluoro-1-propen-1-yl]-2,2-dimethylcyclopropanecarboxylate), chloroprallethrin, cyprothrin, cyfluthrin, beta-cyfluthrin, cyhalothrin, lambda-cyhalothrin, gamma-cyhalothrin, cypermethrin (cyano(3-phenoxyphenyl)methyl 3-(2,2-dichloroethenyl)-2,2-dimethylcyclopropanecarboxylate), alpha-cypermethrin, beta-cypermethrin, theta-cypermethrin, zeta-cypermethrin, cyphenothrin, deltamethrin ((S)-cyano(3-phenoxyphenyl)methyl (1R,3R)-3-(2,2-dibromoethenyl)-2,2-dimethylcyclopropanecarboxylate), dimefluthrin, esfenvalerate, etofenprox ((1-[[2-(4-ethoxyphenyl)-2-methylpropoxy]methyl]-3-phenoxybenzene),
fenpropathrin, fenvalerate, esfenvalerate, flucythrinate, flumethrin, fluvalinate, tau-fluvalinate, halfenprox, imiprothrin, kadethrin, metofluthrin, permethrin ((3-phenoxyphenyl)methyl 3-(2,2-dichloroethenyl)-2,2-dimethylcyclopropanecarboxylate), phenothrin, prallethrin, profluthrin, protrifenbute, pyrethrins I and II, resmethrin, silafluofen, tefluthrin, tetramethrin, tralomethrin, transfluthrin, valerate, and enantiomers thereof.

In one embodiment, the pyrethroid compound can be independently selected from the group consisting of bifenthrin, cypermethrin, deltamethrin, etofenprox and permethrin, or a combination thereof.

In one embodiment, the pyrethroid compound can be independently selected from the group consisting of bifenthrin, etofenprox and permethrin, or a combination thereof.

In one embodiment, the pyrethroid compound may be etofenprox.

In one embodiment, the pyrethroid compound may be permethrin.

In one embodiment, the pyrethroid compound may be bifenthrin.

In one embodiment, the at least one biocide may comprise a nicotinic acetylcholine receptor (nAChR) competitive modulator comprising a neonicotinoid.

The neonicotinoid compounds used in the composition of the present invention are known and include but are not limited to, for example acetamiprid ((1E)-N-[(6-chloro-3-pyridinyl)methyl]-N'-cyano-N-methylethanimidamide), clothianidin ((E)-1-[(2-chlorothiazol-5-yl)methyl]-3- methyl-2-nitroguanidine), dinotefuran (N-methyl-N'-nitro-N"-[(tetrahydro-3-furanyl)methyl]guanidine), imidacloprid ((2E)-1-[(6-chloro-3-pyridinyl)methyl]-N-nitro-2-imidazolidinimin), imidaclothiz, nitenpyram, nithiazine, paichongding, thiacloprid ((Z)-[3-[(6-chloro-3-pyridinyl) methyl]-2-thiazolidinylidene]cyanamide and thiamethoxam (3-[(2-chloro-5-thiazolyl)methyl]tetrahydro-5-methyl-N-nitro-4H-1,3,5-oxadiazin-4-imine).

In one embodiment, the neonicotinoid compound can be independently selected from the group consisting of acetamiprid, clothianidin, dinotefuran, imidacloprid, thiacloprid and thiamethoxam, or a combination thereof.

In one embodiment, the neonicotinoid compound can be independently selected from the group consisting of dinotefuran, imidacloprid and thiacloprid, or a combination thereof.

In one embodiment, the neonicotinoid compound may be acetamiprid.

In one embodiment, the neonicotinoid compound may be clothianidin.

In one embodiment, the neonicotinoid compound may be thiamethoxam.

In one embodiment, the neonicotinoid compound may be dinotefuran.

In one embodiment, the neonicotinoid compound may be thiacloprid.

In one embodiment, the neonicotinoid compound may be imidacloprid.

Fungicides

The following fungicides grouped by mode of action according to the Fungicide Resistance Action Committee (FRAC) are suitable for the invention.

Methyl benzimidazole carbamate fungicides (FRAC code 1) including benomyl, carbendazim, fuberidazole, thiabendazole, thiophanate and thiophanate-methyl.

Dicarboximide fungicides (FRAC code 2) including chlozolinate, dimetachlone, iprodione, procymidone and vinclozolin.

Demethylation inhibitor fungicides (FRAC code 3) including clotrimazole, imazalil, oxpoconazole, prochloraz, pefurazoate, triflumizole, triforine, buthiobate, pyrifenox, fenarimol, nuarimol, triarimol, azaconazole, bitertanol, bromuconazole, cyproconazole, diclobutrazole, difenoconazole, diniconazole, diniconazole-M, epoxiconazole, etaconazole, fenbuconazole, fluquinconazole, flusilazole, flutriafol, hexaconazole, imibenconazole, ipconazole, ipfentrifluconazole, mefentrifluconazole, metconazole, myclobutanil, penconazole, propiconazole, prothioconazole, quinconazole, simeconazole, tebuconazole, tetraconazole, triadimefon, triadimenol, triticonazole and uniconazole.

Phenylamide fungicides (FRAC code 4) including benalaxyl, benalaxyl-M, furalaxyl, metalaxyl, metalaxyl-M, ofurace and oxadixyl.

Amine or morpholine fungicides (FRAC code 5) including aldimorph, dodemorph, fenpropimorph, tridemorph, trimorphamide, fenpropidin, piperalin and spiroxamine.

Phospholipid biosynthesis inhibitors (FRAC code 6) including fenfuram, isoprothiolane, edifenphos, iprobenfos and pyrazophos.

Succinate dehydrogenase inhibitors (FRAC code 7) including fenfuram, pydiflumetofen, carboxin, oxycarboxin, benodanil, flutolanil, mepronil, isofetamid, isoflucypram, benzovindiflupyr, bixafen, fluindapyr, fluxapyroxad, furametpyr, inpyrfluxam, isopyrazam, penflufen, penthiopyrad, sedaxane, boscalid, fluopyram, thifluzamide and pyrazaflumid.

Hydroxy(2-amino-)pyrimidine fungicides (FRAC code 8) including bupirimate, dimethirimol and ethirimol.

Anilinopyrimidine fungicides (FRAC code 9) including cyprodinil, mepanipyrim and pyrimethanil.

N-Phenyl carbamate fungicides (FRAC code 10) including diethofencarb.

Quinone outside inhibitor fungicides (FRAC code 11) including pyribencarb, fluoxastrobin, fenamidone, mandestrobin, azoxystrobin, coumoxystrobin, enoxastrobin, flufenoxystrobin, metyltetraprole picoxystrobin, pyraoxystrobin, pyraclostrobin, pyrametostrobin, triclopyricarb, famoxadone, dimoxystrobin, fenaminostrobin, metominostrobin, orysastrobin, kresoxim-methyl and trifloxystrobin.

Phenylpyrrole fungicides (FRAC code 12) including penpiclonil and fludioxonil.

Aza-naphthalene fungicides (FRAC code 13) including proquinazid and quinoxyfen.

Lipid peroxidation inhibitors (FRAC code 14) including biphenyl, chloroneb, dicloran, quintozene, tecnazene, tolclofos-methyl and etridiazole.

Melanin biosynthesis inhibitors (FRAC codes 16.1, 16.2 and 16.3) including fthalide, pyroquilon, tricyclazole, carpropamid, diclocymet, fenoxanil and tolprocarb.

Hydroxyanilide fungicides (FRAC code 17) including fenpyrazamine and fenhexamid.

Squalene-epoxidase inhibitors (FRAC code 18) including pyributicarb, naftifine and terbinafine.

Polyoxin fungicides (FRAC code 19) including polyoxins.

Phenylurea fungicides (FRAC code 20) including pencycuron.

Quinone inside inhibitor fungicides (FRAC code 21) including cyazofamid, amisulbrom and fenpicoxamid.

Inhibitors of β-tubulin assembly (FRAC code 22) including zoxamide and ethaboxam.

Enopyranuronic acid antibiotic fungicides (FRAC code 23) including blasticidin-S.

Hexopyranosyl antibiotic fungicides (FRAC code 24) including kasugamycin.

Glucopyranosyl antibiotic inhibiting protein synthesis (FRAC code 25) including streptomycin.

Cyanoacetamideoxime fungicides (FRAC code 27) including cymoxanil.

Carbamate fungicides (FRAC code 28) including iodocarb, propamacarb and prothiocarb.

Oxidative phosphorylation uncoupling fungicides (FRAC code 29) including fluazinam, ferimzone, binapacryl, dinocap and meptyldinocap.

Organo tin fungicides (FRAC code 30) including fentin acetate, fentin chloride and fentin hydroxide.

Carboxylic acid fungicides (FRAC code 31) including oxolinic acid.

Heteroaromatic fungicides (FRAC code 32) including hymexazole and octylisothiazolinone. Also included are benzisothiazolinone, butylbenzisothiazolinone, chloroethylisothiazolinone, chloromethylisothiazolinone, dichloromethylisothiazolinone, dichlorooctylisothiazolinone, ethylisothiazolinone, methylisothiazolinone and methyltrimethyleneisothiazolinone.

Phthalamic acid fungicides (FRAC code 34) including tecloftalam.

Benzotriazine fungicides (FRAC code 35) including triazoxide.

Benzene-sulfonamide fungicides (FRAC code 36) including flusulfamide.

Pyridazinone fungicides (FRAC code 37) including diclomezine.

Thiophene-carboxamide fungicides (FRAC code 38) including silthiofam.

Complex I NADH oxido-reductase inhibitors (FRAC code 39) including tolfenpyrad and diflumetorim.

Carboxylic acid amide fungicides (FRAC code 40) including dimethomorph, flumorph, pyrimorph, mandipropamid, benthiavalicarb, benthiavalicarb-isopropyl, iprovalicarb and valifenalate.

Tetracycline antibiotic fungicides (FRAC code 41) including oxytetracycline.

Thiocarbamate fungicides (FRAC code 42) including methasulfocarb.

Benzamide fungicides (FRAC code 43) including fluopicolide and fluopimomide.

Triazolopyrimidylamine fungicides (FRAC code 45) including ametoctradin.

Cyanoacrylate fungicides (FRAC code 47) including phenamacril.

Dithiocarbamate fungicides (FRAC code M3) including ferbam, mancozeb, maneb, metiram, propineb, thiram, zineb and ziram Phthalimide fungicides (FRAC code M4) including captafol, captan and folpet.

Chloronitrile fungicides (FRAC code M5) including chlorothalonil.

Sulfamide fungicides (FRAC code M6) including dichlofluanid and tolylfluanid

Guanidine fungicides (FRAC code M7) including dodine, guazatine and iminoctadine.

Triazine fungicides (FRAC code M8) including anilazine.

Quinone fungicides (FRAC code M9) including dithianon.

Quinoxaline fungicides (FRAC code M10) including quinomethionate

Also included are fungicides of unknown or uncertain mode of action including aminopyrifen, bethoxazin, cyflufenamid, dichlobentiazox, ferimzone, florylpicoxamid, flutianil, ipflufenoquin, metrafenone, picarbutrazox, dipymetitrone, pyriofenone, pyridachlometyl, quinofumelin, tebufloquin and validamycin.

The fungicides used in the composition of the present invention are known and include but are not limited to demethylation inhibitor fungicides comprising azoles, succinate dehydrogenase inhibitors comprising phenyl-benzamides, quinone outside inhibitor fungicides (FRAC code 11) and anilinopyrimidine fungicides.

In one embodiment, the fungicide can be independently selected from the group consisting of azoles, phenyl-benzamides, quinone outside inhibitor fungicides and anilinopyrimidine fungicides, or a combination thereof.

In one embodiment, the at least one biocide may comprise a demethylation inhibitor fungicides comprising an azole.

The azoles used in the composition of the present invention are known and include but are not limited to, for example clotrimazole, imazalil, oxpoconazole, prochloraz, pefurazoate, triflumizole, triforine, buthiobate, pyrifenox, fenarimol, nuarimol, triarimol, azaconazole, bitertanol, bromuconazole, cyproconazole (α-(4-chlorophenyl)-α-(1-cyclopropylethyl)-1H-1,2,4-triazole-1-ethanol), diclobutrazole, difenoconazole, diniconazole, diniconazole-M, epoxiconazole (rel-1-[[(2R,3S)-3-(2-chlorophenyl)-2-(4-fluorophenyl)-2-oxiranyl]methyl]-1H-1,2,4-triazole), etaconazole, fenbuconazole, fluquinconazole, flusilazole, flutriafol, (α-butyl-α-(2,4-dichlorophenyl)-1H-1,2,4-triazole-1-ethanol), imibenconazole, ipconazole, ipfentrifluconazole, mefentrifluconazole, metconazole, myclobutanil, penconazole (1-[2-(2,4-dichlorophenyl)pentyl]-1H-1,2,4-triazole), propiconazole (1-[[2-(2,4-dichlorophenyl)-4-propyl-1,3-dioxolan-2-yl]methyl]-1H-1,2,4-triazole), prothioconazole, quinconazole, simeconazole, tebuconazole (α-[2-(4-chlorophenyl)ethyl]-α-(1,1-dimethylethyl)-1H-1,2,4-triazole-1-ethanol), tetraconazole, triadimefon (1-(4-chlorophenoxy)-3,3-dimethyl-1-(1H-1,2,4-triazol-1-yl)-2-butanone), triadimenol (β-(4-chlorophenoxy)-α-(1,1-dimethylethyl)-1H-1,2,4-triazole-1-ethanol), triticonazole and uniconazole.

In one embodiment, the azole can be independently selected from the group consisting of cyproconazole, epoxiconazole, penconazole, propiconazole, tebuconazole, triadimefon, triadimenol, or a combination thereof.

In one embodiment, the azole can be independently selected from the group consisting of tebuconazole, propiconazole, or a combination thereof.

In one embodiment, the azole may be epoxiconazole.

In one embodiment, the azole may be triadimenol.

In one embodiment, the azole may be propiconazole.

In one embodiment, the azole may be tebuconazole.

In one embodiment, the azole may be penconazole.

In one embodiment, the azole may be cyproconazole.

In one embodiment, the azole may be triadimefon.

In one embodiment, the at least one biocide may comprise a succinate dehydrogenase inhibitor comprising a phenyl-benzamide.

The phenyl-benzamides used in the composition of the present invention are known and include but are not limited to, for example benodanil, flutolanil (N-[3-(1-methylethoxy)phenyl]-2-(trifluoromethyl)benzamide) and mepronil.

In one embodiment, the phenyl-benzamide can be independently selected from the group consisting of benodanil, flutolanil, mepronil, or a combination thereof.

In one embodiment, the phenyl-benzamide may be flutolanil.

In one embodiment, the at least one biocide may comprise a succinate dehydrogenase inhibitor comprising an anilino-pyrimidine fungicide.

The anilinopyrimidine fungicides used in the composition of the present invention are known and include but are not limited to, for example cyprodinil, mepanipyrim and pyrimethanil (4,6-dimethyl-N-phenyl-2-pyrimidinamine).

In one embodiment, the anilinopyrimidine fungicide can be independently selected from the group consisting of cyprodinil, mepanipyrim and pyrimethanil, or a combination thereof.

In one embodiment, the anilinopyrimidine fungicide may be pyrimethanil.

In one embodiment, the at least one biocide may comprise a quinone outside inhibitor fungicides.

The quinone outside inhibitor fungicides used in the composition of the present invention are known and include but are not limited to pyribencarb, fluoxastrobin, fenaminedone, mandestrobin, azoxystrobin (methyl (αE)-2-[[6-(2-cyanophenoxy)-4-pyrimidinyl]oxy]-α-(methoxymethylene)benzeneacetate), coumoxystrobin, enoxastrobin, flufenoxystrobin, metyltetraprole picoxystrobin, pyraoxystrobin, pyraclostrobin (methyl N-[2-[[[1-(4-chlorophenyl)-1H-pyrazol-3-yl]oxy]methyl]phenyl]-N-methoxycarbamate), pyrametostrobin, triclopyricarb, famoxadone, dimoxystrobin, fenaminostrobin, metominostrobin, orysastrobin, kresoxim-methyl and trifloxystrobin (methyl (αE)-α-(methoxyimino)-2-[[[[(1E)-1-[3-(trifluoromethyl)phenyl]ethylidene]amino]oxy]methyl]benzeneacetate).

In one embodiment, the quinone outside inhibitor fungicide can be independently selected from the group consisting of azoxystrobin, pyraclostrobin, trifloxystrobin or a combination thereof.

In one embodiment, the quinone outside inhibitor fungicide may be pyraclostrobin.

In one embodiment, the quinone outside inhibitor fungicide may be trifloxystrobin.

In one embodiment, the quinone outside inhibitor fungicide may be azoxystrobin

In one embodiment, the at least one biocide comprises one or more insecticides, or one or more fungicides, or a combination thereof.

In one embodiment the at least one biocide is selected from the group consisting of a neonicotinoid, a synthetic pyrethroid, a phenylpyrazole, an azole, an anilinopyrimidine fungicides, a quinone outside inhibitor fungicide, a phenyl-benzamide, or any combination thereof.

In one embodiment the at least one biocide comprises imidacloprid, bifenthrin, fipronil, triadimefon, cyproconazole, pyrimethanil, azoxystrobin, flutolanil, or any combinations thereof.

In one embodiment the at least one biocide is imidacloprid.

In one embodiment the at least one biocide is bifenthrin.

In one embodiment the at least one biocide is fipronil.

In one embodiment the at least one biocide is triadimefon.

In one embodiment the at least one biocide is cyproconazole.

In one embodiment the at least one biocide is pyrimethanil.

In one embodiment the at least one biocide is azoxystrobin.

In one embodiment the at least one biocide is flutolanil.

Particles

According to the present invention, the biocide present in the composition is in particulate form. The biocide particles can be formed by dispersion and/or comminution of the biocide technical in order to form readily dispersible compositions suitable for glueline addition as described below.

Where necessary the particle size of the biocide technical may be reduced by any form of milling action based on grinding, cutting, shearing, etc., followed by screening and, where necessary, reprocessing of oversized particles. This may be done before or after combining the biocide technical material with other formulation ingredients. The material may be milled dry or in the presence of a non-solvent liquid, generally water. A wide variety of dry milling equipment can be used including a hammer mill, pin mill, cutting mill, ball mill, disk mill, jet mill, classifier mill, and the like. Suitable wet milling equipment may include a bead mill, shear pump, colloid mill, or the like.

The particle size of the biocide can vary.

In one embodiment the D [4,3] is at least about 20 µm.

In one embodiment the D [4,3] is at least about 22.5 µm.

In one embodiment the D [4,3] is at least about 25 µm.

In another embodiment the D [4,3] is at least about 30 µm.

In another embodiment the D [4,3] is at least about 35 µm.

Further preferred D [4,3] values include values of equal to or more than 35 µm, 40 µm, 45 µm, 50 µm, 55 µm, 60 µm, 65 µm, 70 µm, 75 µm, 80 µm, 85 µm, 90 µm, 95 µm or 100 µm.

The upper limit for the biocide particle size is determined first by the particle size distribution of the biocide technical material as received from the manufacturer. Biocide technical material may be supplied as raw or crudely milled crystals or in some irregular particulate form, generally ranging in particle size from about 1 µm to about 1,000 µm. Agglomerated particles must be dispersed during formulation and some reduction in particle size may be required to ensure that individual particles can pass through any filters used in the mill during glue application. These filters can range in aperture size from about 250 to 500 µm.

Thus, in one embodiment, a practical upper limit for the biocide particles is a Dv90 of 500 µm or less. Further Dv90 values of the biocide particles include 475 µm or less, 450 µm or less, 425 µm or less, 400 µm or less, 375 µm or less, 350 µm or less, 325 µm or less, 300 µm or less, 275 µm or less, 250 µm or less, 225 µm or less and 200 µm or less.

The Dv90 is preferably about 400 µm or less, more preferably about 300 µm or less, and particularly preferably about 250 µm or less.

In one embodiment the biocide has a volume weighted percentile Dv90 of about 400 µm or less.

In one embodiment the at least one biocide is independently selected from the group consisting of a neonicotinoid, a synthetic pyrethroid, a phenylpyrazole, an azole, an anilinopyrimidine fungicides, a quinone outside inhibitor fungicide, a phenyl-benzamide, or any combination thereof, wherein said biocide has a volume mean diameter of D [4,3] of at least about 20 µm.

In one embodiment the at least one biocide is independently selected from the group consisting of imidacloprid, bifenthrin, fipronil, triadimefon, cyproconazole, pyrimethanil, azoxystrobin, flutolanil, or any combination thereof, wherein said biocide has a volume mean diameter of D [4,3] of at least about 20 µm.

In one embodiment the at least one biocide is independently selected from the group consisting of a neonicotinoid, a synthetic pyrethroid, a phenylpyrazole, an azole, an anilinopyrimidine fungicides, a quinone outside inhibitor fungicide, a phenyl-benzamide, or any combination thereof, wherein said biocide has a volume weighted percentile Dv90 of about 400 µm or less.

In one embodiment the at least one biocide is independently selected from the group consisting of imidacloprid, bifenthrin, fipronil, triadimefon, cyproconazole, pyrimethanil, azoxystrobin, flutolanil, or any combination thereof, wherein said biocide has a volume weighted percentile Dv90 of about 400 µm or less.

The optimal particle size may vary from one biocidal active ingredient to another.

Particle sizes in any range suitable for the invention can be prepared using commercially available sieves, including for example sieves ranging from a US Standard Mesh No. 500 (25 µm nominal sieve opening) to a No. 10 (2,000 µm nominal sieve opening). Any range of particle sizes obtained with an approximate lower limit and an approximate upper limit may be prepared using two different commercially available sieves and keeping the fraction retained by the sieve with the smaller sieve opening. Defined particle size ranges may also be produced using classifier mills, and gravitational and centrifugal air classification equipment, etc., as known in the art. Further defined particle size ranges may be produced by wet milling a suspension until the desired range is achieved.

Particle sizes may be measured by sieve analysis, microscopic examination and image analysis, or by laser diffraction, etc. Relevant ISO methods of measurement and presentation of particle size distributions include, for example, ISO 13320:2020 "Particle size analysis—Laser diffraction methods", and ISO 9276 "Representation of results of particle size analysis", which is split into multiple parts. Preferably, the particle size of the biocide is determined by laser diffraction in water according to ISO 13320:2020 "Particle size analysis—Laser diffraction methods".

Formulations

The biocide compositions of the invention may be used in powdered form without addition of further ingredients, or may be combined with further ingredients and formulated according to known methods. More than one biocide may be formulated together. For example, the formulation may contain two fungicides, one fungicide and one insecticide, or two fungicides plus an insecticide.

The biocide in particulate form may be formulated in a non-solvent liquid to provide liquid formulations including a suspension, a flowable, or a dispersion, or formulated as a solid formulation including a powder or a granule.

In one embodiment, the composition is formulated as a suspension in water.

In one embodiment, the composition is formulated suitable for glue addition.

In one embodiment, the composition is formulated as a suspension in water and water-miscible non-solvent liquids.

In one embodiment, the composition is formulated suitable for glue addition, preferably as a suspension in water and water-miscible non-solvent liquids.

Formulation types and methods of formulating biocidal active ingredients in their native form are described, for example, in "Chemistry and Technology of Agrochemical Formulations," D. A. Knowles ed., Kluwer Academic Publishers, Dordrecht (1998), and "Pesticide Formulation and Adjuvant Technology," C. L. Foy and D. W. Pritchard eds., CRC Press, Boca Raton (1996), and "Formulation Technology: Emulsions, Suspensions, Solid Forms," H. Mollet and A. Grubenmann, Wiley-VCH, New York (2001). Typical formulation types include suspensions, dispersions, powders and granules.

The choice of formulation type is largely determined by the properties of the glue in use.

The formulation may contain customary formulation additives, the functions of which are described in the previously mentioned publications. Such additives may include one or more fluids including water, surfactants, dispersants, emulsifiers, penetrants, spreaders, wetting agents, inerts, colloids, suspending agents (e.g. magnesium aluminium silicate), thickeners, thixotropic agents (e.g. xanthan gum), polymers, glidants, acids, bases, salts, organic and inorganic solid matrices of various kinds, preservatives, anti-foam agents, anti-freeze agents, anti-caking agents, lubricants, stickers, binders, dyes, pigments, and the like.

The surfactants can be anionic, cationic or nonionic in character. Surfactants conventionally used for biocide formulation and which may also be used as formulation additives in the present invention are described in for example, "McCutcheon's Detergents and Emulsifiers Annual", MC Publishing Corp., Ridgewood, New Jersey, 2020. Surfactants are typically used as dispersants, emulsifiers and wetting agents and include salts of alkyl sulfates, alkylarylsulfonate salts, alcohol-alkylene oxide addition products, soaps, alkylnaphthalenesulfonate salts, dialkyl esters of sulfosuccinate salts, sorbitol esters, polyethylene glycol esters of fatty acids, block copolymers of ethylene oxide and propylene oxide, alkyl and aryl phosphate esters and salts thereof, and mixtures thereof. The surfactant or mixture of surfactants is typically present at a concentration of from 1 to 20%, preferably 1-10% by weight based on the total weight of the formulation.

Water-miscible non-solvent liquids suitable for the invention include glycerol, ethylene glycol, propylene glycol and sugar alcohols such as sorbitol. These may be added at concentrations ranging from 0 to 15% by weight, preferably from 0 to 10% by weight, based on the total weight of the formulation. Compositions can be formulated using known methods involving blending and further processing of the biocide and suitable customary formulation additives by means of dispersing, finely dividing, slurring, emulsifying, homogenizing, stirring, wet and dry milling, stabilising, drying, granulating, etc., in order to prepare a formulation suitable for glueline addition. During formulation, gentle mixing may be required to avoid excessive particle size reduction of active ingredients.

The composition may comprise one or more biocides in a wide range of relative quantities.

In one embodiment, the composition comprises about 1 to 99% biocide particles by weight, preferably about 3 to 95% biocide particles by weight, based on the total weight of the composition. In all cases, the remainder of the composition comprises formulation auxiliaries and/or non-solvent liquids used to formulate the solid or liquid formulation.

It is preferred that the biocide particles are formulated so as to be suitable for glue addition. A composition that is suitable for glue addition is readily and evenly dispersible within the glue mixture and the resulting glue-biocide mixture must remain stable from the time of biocide addition to the time of application. The composition must not impact on the cure time and adhesive properties of the glue, its working properties including viscosity and tack, and the composition must not significantly alter the mechanical properties of the finished glued-wood product.

Methods of measuring the degree of dispersion are commonly known, e.g. "MT 160 Spontaneity of Dispersion of Suspension Concentrates", p. 391, in Dobrat, W, and A Martijn. CIPAC Handbook: Vol. F. Harpenden: Collaborative International Pesticides Analytical Council, 1995. Adhesive properties and other requirements for plywood layup may be measured for example according to ISO 13609:2014 Wood-based panels—Plywood—Blockboards and battenboards. Bond strength may be measured according to ISO 12466-1:2007 Plywood—Bonding quality—Part 1: Test methods. Methods for determining structural properties include ISO 22390:2020 Timber structures—Laminated veneer lumber—Structural properties.

Further details of suitable formulation methods are provided in the examples.

Use in Glueline Treatments

The compositions of the invention and formulations thereof are particularly suited for use in glueline treatment of glued-wood products.

In one embodiment, the composition of the invention containing the biocide particles may be incorporated directly into the glue or native resin component of hot-pressed or hot-pressed and block-stacked glued-wood products.

In this case, the composition comprising the biocide particles may be blended directly into the native resin or the glue mixture at any time from resin production to use in the mill manufacturing the glued-wood product. For example, the composition comprising the biocide particles may be added directly to the native resin or to the glue mixture at the resin plant and shipped as part of a ready-to-use glue mixture. Alternatively, the composition comprising the biocide particles may be added to the glue in the mill at any time before glue application during the layup operation.

Direct glue addition may be performed by blending the composition comprising the biocide particles into the glue in the form of dry particulates, a powdered formulation or a liquid formulation of the particles.

Dry forms of the composition comprising the biocide particles may be added to dry glue. Dry and liquid forms of the composition comprising the biocide particles may be added to liquid resins or glue mixtures. Generally speaking, a liquid formulation of milled compositions comprising the biocide particles is more readily blended into liquid resins or glue mixtures.

Direct glue addition is common in the manufacture of engineered wood products where the composition comprising the biocide particles is blended into the glue or the native resin before it is used. The glue-particle combination may be applied to constituent veneers by pumping, blending, extruding, soaking, dipping, spinning, atomising, spraying, pouring, rolling, foaming, or curtain coating, etc. Direct glue addition may also be used with reconstituted wood-based products.

In another embodiment, the composition of the invention comprising the biocide particles may be incorporated indirectly into the glue component of hot-pressed or hot-pressed and block-stacked glued-wood products. In this case the composition of the invention is added to the wood in a stream separate from the glue.

When the composition is added before the glue, the composition is typically coated onto the wood component. When added concomitantly with the glue, both the glue and biocide will coat the wood component more or less together. When the composition is added after the glue, the biocide generally first encounters the glue, then merges into the glue and meets the underlying wood component.

The three relative addition steps may be conveniently accomplished, for example, by the relative positioning of spray jets or spinning disks in a typical chip or strand tumbler where various ingredients are added to the wood component to provide a "furnish" which is spread onto a forming belt before hot pressing.

Indirect glue addition may be practiced in the manufacture of engineered wood products by spraying, misting or otherwise coating the composition comprising the biocide particles onto veneers before the layup operation.

Indirect glue addition may be more common in the manufacture of reconstituted wood-based products where the composition comprising the biocide particles may be applied to the wood raw material ("furnish") by injection into a refiner, blow line, strand or chip tumbler, sometimes in mixture with waxes and other agents, prior to, at the same time as or after introduction of the glue mixture. This method of manufacture is widely used with isocyanate resins where it is necessary to minimise the extent and duration of exposure to water. It is also widely practiced with a range of other resin types where blending of a number of ingredients is required to provide a homogeneous mat prior to hot pressing.

Direct and indirect glue addition of the compositions of the invention result in distribution of biocide throughout the glueline during manufacture of a glued-wood product. The glueline may be planar as in an engineered wood product such as plywood or LVL, or it may be a complex network structure following the multifaceted surfaces of the wood flakes, strands, and fibres, etc., that make up reconstituted wood-based products. Direct and indirect glue addition techniques as described above both result in distribution of the biocide particles throughout the glue zone of the glued-wood product.

The present invention also provides a glue for glueline treatment of glued-wood products comprising the composition of the invention.

In one embodiment the present invention further provides a method for increasing the retention of a biocide in a glueline-treated glued-wood product that has been hot-pressed and/or block-stacked during manufacture comprising applying a composition to the glueline during the production of said product, wherein said composition comprises particles of at least one biocide,
wherein the at least one biocide is independently selected from the group consisting of a neonicotinoid, a synthetic pyrethroid, a phenylpyrazole, an azole, an anilinopyrimidine fungicides, a quinone outside inhibitor fungicide, a phenyl-benzamide, or any combination thereof,
wherein said biocide has a volume mean diameter of D [4,3] of at least about 20 μm,
wherein said composition comprises about 1 to 99% of biocide particles by weight, preferably about 2 to 97% of biocide particles by weight, more preferably about 3 to 95% of biocide particles by weight, based on the total weight of the composition.

In one embodiment the present invention further provides a method for increasing the retention of a biocide in a glueline-treated glued-wood product that has been hot-pressed and/or block-stacked during manufacture comprising applying a composition to the glueline during the production of said product, wherein said composition comprises particles of at least one biocide,
wherein the at least one biocide is independently selected from the group consisting of a neonicotinoid, a synthetic pyrethroid, a phenylpyrazole, an azole, an anilinopyrimidine fungicides, a quinone outside inhibitor fungicide, a phenyl-benzamide, or any combination thereof,
wherein said biocide has a volume mean diameter of D [4,3] of at least about 20 μm,
wherein said composition comprises about 1 to 99% of biocide particles by weight, preferably about 2 to 97% of biocide particles by weight, more preferably about 3 to 95% of biocide particles by weight, based on the total weight of the composition,
wherein said glued wood product is a glued veneer product that is hot pressed and in particular hot pressed and block stacked during manufacture, and
wherein said phenolic resin is independently selected from the group consisting of novolac-type and resole-type phenol-formaldehyde (PF) resins, resorcinol-formaldehyde resins, phenol-resorcinol-formaldehyde resins or a combination thereof.

In another embodiment the present invention further provides a method for increasing the retention of a biocide in a glueline-treated glued-wood product that has been hot-pressed and/or block-stacked during manufacture comprising applying a composition to the glueline during the production of said product, wherein said composition comprises particles of at least one biocide,
wherein the at least one biocide is independently selected from the group consisting of imidacloprid, bifenthrin, fipronil, triadimefon, cyproconazole, pyrimethanil, azoxystrobin, flutolanil, or any combination thereof,
wherein said biocide has a volume mean diameter of D [4,3] of at least about 30 μm,
wherein said composition comprises about 1 to 99% of biocide particles by weight, preferably about 2 to 97% of biocide particles by weight, more preferably about 3 to 95% of biocide particles by weight, based on the total weight of the composition, wherein said glued wood product is a glued veneer product that is a glued veneer product that is hot pressed and in particular hot pressed and block stacked during manufacture, and wherein said phenolic resin is independently selected from the group consisting of novolac-type and resole-type phenol-formaldehyde (PF) resins, resorcinol-formaldehyde resins, phenol-resorcinol-formaldehyde resins, or a combination thereof.

In another embodiment the present invention further provides a method for increasing the retention of a biocide in a glueline-treated glued-wood product that has been hot-pressed and/or block-stacked during manufacture comprising applying a composition to the glueline during the production of said product, wherein said composition comprises particles of at least one biocide, wherein the at least one biocide is independently selected from the group consisting of imidacloprid, bifenthrin, fipronil, triadimefon, cyproconazole, pyrimethanil, azoxystrobin, flutolanil, or any combination thereof, wherein said biocide has a volume mean diameter of D [4,3] of at least about 30 µm, wherein said composition comprises about 1 to 99% of biocide particles by weight, preferably about 2 to 97% of biocide particles by weight, more preferably about 3 to 95% of biocide particles by weight, based on the total weight of the composition, wherein said glued wood product is a glued veneer product that is hot pressed and in particular hot pressed and block stacked during manufacture, and wherein said phenolic resin is independently selected from the group consisting of novolac-type and resole-type phenol-formaldehyde (PF) resins, resorcinol-formaldehyde resins, phenol-resorcinol-formaldehyde resins, or a combination thereof.

Glues and native resins within the scope of the invention include thermoset polymers including phenolic resins comprising novolac-type and resole-type phenol-formaldehyde (PF) resins, resorcinol-formaldehyde resins and phenol-resorcinol-formaldehyde resins, and amino resins including hydroxymethyl or alkoxymethyl derivatives of urea, melamine, benzoguanamine, and glycoluril, chiefly urea-formaldehyde, melamine-formaldehyde, and melamine-urea formaldehyde resins. Also included are isocyanate resins based on (partially) polymerised diisocyanates, mainly polymeric diphenylmethane diisocyanate (pMDI), thermoset epoxy and polyurethane resins, PVAs, as well as adhesives based on biomaterials including proteins, starches and lignocellulosic extractives such as lignins, etc.

Native resins such as isocyanate resins like polymeric diphenylmethane diisocyanate (pMDI), can be used as is, but most resins are applied to the wood component in mixture with water, wetting agents, inorganic and organic fillers and extenders (generally lignocellulosic residues), catalysts, plasticisers and additives with various other functions. As such they are termed "glue mixtures" or simply glues. The native resins and derived glue mixtures may be in a liquid or powdered state when combined with the particle of the invention.

Glued-wood products wherein the glue is treated using the inventive composition comprising biocide particles are manufactured by conventional means using standard manufacturing equipment. No changes in methods of hot pressing and/or block stacking are required to practice the invention.

The biocide particles are applied to the resin, glue mixture or furnish, in sufficient quantities to achieve the desired retentions of biocidal ingredients in the glued-wood product taking into account the relative amounts of glue and wood component, and any analytical losses that may occur during hot pressing and/or block stacking. The biocide loading is generally determined by calculation and is therefore a nominal value.

Minimum retentions of biocidal ingredients are generally specified with reference to a particular "hazard class" for the finished product, i.e. a category relating to the durability of the product in a defined geographical area, the location of the product in a building or structure, its exposure to moisture, proximity to the ground, etc.

Minimum retentions, methods of extraction and analysis as well as other requirement are set by standards or code marks and by organisations such as Australasian Wood Preservation Committee, American Wood Preservers Association, Japanese Industrial Standards, EN Standards, etc.

EXAMPLES

The following Examples are illustrative of the invention and the scope of the invention is not intended to be limited thereto.

Abbreviations

| | |
|---|---|
| AS/NZA 1605.3:2006 | Australia and New Zealand Standard ™ Methods for sampling and analysing timber preservatives and preservative-treated timber Part 3: Analysis methods for determination of preservative retention |
| BIT | Benzisothiazoline-3-one (CAS 2634-33-5) |
| EC | Emulsifiable concentrate |
| GC | Gas chromatography |
| g/m$^2$ | Grams of glue per square metre of vaneer |
| gai/m$^3$ | Grams of biocide active ingredient per cubic metre of finished plywood |
| HPLC | High preformance liquid chromatography |
| LVL | Laminated vaneer lumber |
| LP | Large particle |
| MCIT | Methylchloroisothiazolinone (CAS 26172-55-4) |
| MDF | Medium density fibreboard |
| OSB | Oriented strand board |
| MPa | Megapascal (unit of pressure) |
| PF | Phenol-formaldehyde |
| PVC | Polyvinyl chloride |
| PTFE | Polytetrafluoroethylen (Teflon ®) |
| SAN | Styrene acrylonitrile copolymer |
| SC | Suspension concentrate |
| wt % | Weight as a percentage of the weight of the total mixture |
| % m/m | % mass/mass based on the oven-dried mass of the wood test sample (unit of biocide retention) |

Materials

| | |
|---|---|
| Bifenthrin | CAS 82657-04-3, 98% tech, supplied by DVA AGRO GmbH |
| Imidacloprid | CAS 138261-41-3, 97% tech, supplied by Argolex Pte Ltd |
| Triadimefon | CAS 43121-43-3, 97% tech, supplied by DVA AGRO GmbH |
| Cyproconazole | CAS 94361-06-5, 96% tech supplied by DVA AGRO GmbH |
| Pyrimethanil | CAS 53112-28-0, 95.7% tech, supplied by Agrolex Pte Ltd |
| Azoxystrobin | CAS 131860-33-8, 98.6% tech, supplied by Shanghai Jinsheng |
| Flutolanil | CAS 66332-96-5, 95% tech, supplied by Shanghai Jinsheng |

| | |
|---|---|
| Fipronil | CAS 120068-37-3, 96% tech, supplied by Gharda Chemicals Ltd |
| Prefere® PF resin | Ready to use phenol-formaldehyde (PF) resin, tradename: Prefere®, supplied by AICA NZ Ltd, CAS 9003-35-4 |
| Gensil 2000 | Silicon Anti-foam emulsion, CAS 63148-62-9 |
| Kalas® | Fipronil as a 200 g/L SC, available from Lonza NZ Ltd |

Methods

AS/NZS 1604.3:2021 "Preservative-treated wood-based products—Part 3: Test methods." Standard specifies requirements for testing and analysing preservatives and preservative-treated wood-based products. Includes penetration spot tests, retention tests and solution analysis.

AS/NZS 1604.4:2006 "Specification for preservative treatment Laminated veneer lumber (LVL)", Sets out a specification for preservative treatment of laminated veneer lumber (LVL). It specifies the bond type, preservative penetration pattern, and the preservative retention requirements suitable for each hazard class.

AS/NZS 1605.3:2006 "Methods for sampling and analysing timber preservatives and preservative-treated timber." Analysis methods for determination of preservative retention. Specifies the analysis methods for determination of preservative retention in treated timber.

Methods for Analysis of Biocide Retentions

| Biocide | Extraction solvent & method | Analysis method |
|---|---|---|
| Imidacloprid | Methanol, high shear, 3 min | ELISA according to AS/NZS 1605.3:2006, Section 18 |
| Bifenthrin | Methanol, sonication, 16 h | GC according to AS/NZS 1605.3:2006, section 14 |
| Triadimefon/ cyproconazole | Methonal, soxhlet extraction, 30 min | GC according to AS/NZS 1605.3:2006, section 19 (amendment proposed) |
| Pyrimethanil Flutolanil | Acetone, sonication, 16h | GC. Detection: FID. Column temp.: 150° C. for 1 min, ramp to 280° C. at 15° C./min. Internal standard: dibutyl phthalate. |
| Azoxystrobin | Acetonitrile, sonication, 16 h | HPLC. Detection: 223 nm. Mobile phase: acetonitrile:water:0.5 mole/litre $H_2SO_4$ 300:200:2.5. Internal standard: hezazinone. |
| Fipronil | Acetonitrile, sonication, 16 h | HPLC. Detection: 280 nm. Mobile phase: water:acetonitrile 35:65. Internal standard: diphenyl sulfone. |

Particle Size Analysis

Particle size analysis was conducted by laser diffraction in water using a Malvern Mastersizer 3000 instrument with the following analysis settings: Particle Refractive Index, 1.596; Particle Absorption Index, 0.010; Dispersant Name, Water; Dispersant Refractive Index, 1.330; Scattering Model, Mie; Analysis Model, General Purpose. Samples were added dropwise into 500 ml water circulating through the Mastersizer 3000 until the laser obscuration was within the range 1-20% before conducting the measurement. Particle size D [4,3] and Dv90 values are reported below.

Examples 1-4

Imidacloprid technical (208.33 g) was suspended in about 400 ml of water containing 32.9 g of dispersants and wetting agents (disp/wetters) comprising a 2:1 mixture by weight of tristyryl phenol-polyethylene glycol-phosphoric acid ester and polyethylene-polypropylene glycol, monobutyl ether. After adding 9.6 g magnesium aluminium silicate (Mg Al silicate, suspending and thickening agent), 0.32 g benzisothiazolinone (BIT) and benzisothiazolinone (MCIT) preservatives, 0.2 g citric acid and 0.6 g Gensil 2000, (antifoam) the mixture was stirred gently to produce a homogeneous intermediate suspension. The intermediate suspension was then combined with 2.0 g xanthan gum (suspending and thickening agent) dispersed in water and made up to 1 Litre with water. This is Example 4 and contained the largest particles (Table 1). Examples 1-3 contained the same ingredients at the same concentrations but the intermediate imidacloprid suspension was bead milled to the particle sizes shown in Table 1 and FIG. 1 before making up to 1 Litre.

Example 1 relates to a composition comprising imidacloprid particles with a particle size typical of a suspension concentrate wherein the D [4,3] was 8.47 µm. Examples 2-4 contained imidacloprid particles with a particle size larger than a suspension concentrate (Table 1).

TABLE 1

Particle size analysis of Examples 1-4

| | Example | | | |
|---|---|---|---|---|
| | 1 | 2 | 3 | 4 |
| Formulation type | SC | Large particle suspension | | |
| D [4, 3] (µm) | 8.47 | 15.9 | 39.9 | 114 |
| Dv90 (µm) | 12.5 | 29.2 | 78.8 | 225 |

Examples 1-4 were each combined with PF resin (Prefere® PF resin) and applied onto the tight side of seven rotary peeled veneers (Pinus radiata, 300 mm×300 mm×3.2 mm) which were then laid up alternating at right angles to each other in typical plywood fashion. The glue spread rate was 200 g glue per square meter of veneer (200 g/m$^2$) and the imidacloprid application rate was 500 grams of active ingredient per cubic meter of finished plywood (500 gai/m$^3$). After cold pressing, the plywood layups were sawn into quarters then hot-pressed for 20 minutes at 140° C. and approx. 8 MPa.

After hot pressing the plywood portions were subjected either to:
a) "hot-pressed" conditions only: allowed to cool to ambient temperature immediately, or
b) "hot-pressed" and simulated "block stacked" conditions: wrapped in aluminium foil and held in an oven at 100° C. for the times indicated (see FIG. 1), before allowing to cool to ambient temperature.

Plywood specimens were then cut into 20 mm×20 mm squares, ground in a Wiley® mill and analysed to determine imidacloprid retentions as described in the Methods section above.

Retention data produced by the methods, as specified, are expressed as % m/m, i.e. the mass of biocide as a percentage of the oven-dried mass of the wood test sample.

Data in this form can be more readily evaluated as a percentage of the nominal loading, i.e. how much of the applied biocide is "recovered" after hot pressing or hot pressing and simulated block stacking. To calculate such recoveries for plywood, the nominal loading is first converted from gai/m³ to % m/m based on a plywood oven dry density of 450 kg/m³ according to the following formula:

% m/m=gai/m³/450 kg/m³/10

The recovery is then calculated according to the formula:

Percentage nominal loading=retention/loading×100%

When imidacloprid was applied as a conventional formulation, namely a suspension concentrate (SC) (Example 1), approximately 30% of the applied imidacloprid was recovered after hot pressing (FIG. 1). This result demonstrates one aspect of the problem to be solved by the present invention, i.e. the loss of biocide associated with the hot pressing operation. When the plywood containing Example 1 was hot pressed and subjected to simulated block stacking, most of the remaining imidacloprid was lost, even after only 24 h at 100° C. (FIG. 1). This result demonstrates another, particularly important aspect of the problem to be solved, the further loss of biocide after hot pressing that occurs during block stacking.

When the three large particle suspensions (Examples 2-4) were used, approximately 30% of the applied imidacloprid was lost after hot pressing only. However, when using Example 4, a suspension containing imidacloprid particles with a D [4,3] of 114 µm, the retention after hot pressing and block stacking increased considerably compared to Example 1 (and Examples 2 and 3), even after 72 h at 100° C.

Use of an imidacloprid large particle suspension (Example 4) would enable a large reduction in the imidacloprid application rate to achieve the same retention as a suspension concentrate as used in Example 1 at the end of the manufacturing process.

Examples 5-7

For each of Examples 5-7, bifenthrin technical (9.53 g) was suspended in a mixture containing 1.88 g of dispersants and wetting agents comprising a 2:1 mixture by weight of tristyryl phenol-polyethylene glycol-phosphoric acid ester and polyethylene-polypropylene glycol, monobutyl ether, 0.53 g magnesium aluminium silicate (Mg Al silicate), 0.32 g of benzisothiazolinone and methylchloroisothiazolinone preservatives, 0.08 g Gensil 2000 (silicone foam) and 75 g water, then stirred gently to produce a homogeneous intermediate suspension. Each intermediate suspension was then subjected to varying degrees of particle size reduction as described below before combining with 0.11 g xanthan gum (suspending and thickening agent) and making the volume up to 100 ml with water. Example 7 was mixed at 3,000 rpm for 1 minute using an IKA Ultra-Turrax laboratory high shear mixer. Example 6 was bead milled at 2,100 rpm-2,652 rpm for 5 minutes. Example 5 was bead milled at 3,000 rpm to 4,200 rpm for 30 minutes.

Example 5 relates to a composition comprising bifenthrin particles with a particle size typical of a suspension concentrate wherein the D [4,3] was 6.91 µm. Examples 6 and 7 contained bifenthrin particles with a particle size larger than a suspension concentrate (Table 2).

TABLE 2

Particle size analysis of Examples 5-7

| | Example | | |
|---|---|---|---|
| | 5 | 6 | 7 |
| Formulation type | SC | Large Particle suspension | |
| D [4, 3] (µm) | 6.91 | 21.9 | 60.8 |
| Dv90 (µm) | 14.3 | 39.0 | 201 |

Examples 5-7 were each combined with Prefere® PF resin and used to make glueline-treated plywood as described above. In this instance the bifenthrin application rate was 50 gai/m³. Plywood specimens were ground in a Wiley mill to pass through a 3 mm screen and bifenthrin analysis was performed by GC as described in Methods.

The bifenthrin recoveries after hot pressing alone were in the range 68-72% depending on whether the plywood was treated with a typical suspension concentrate (Example 5) or with suspensions of larger particles (Examples 6 and 7, FIG. 2). When held at 100° C., bifenthrin recoveries progressively declined by a further 32% when the glueline was treated with the suspension concentrate (Example 5), but only declined by 10% or less when using bifenthrin suspensions with a D [4,3] of 21.9 µm or greater, resulting in higher final retentions at the completion of hot pressing and simulated block stack conditions. Use of a bifenthrin large particle suspension (Examples 6 and 7) would enable a significant reduction in the bifenthrin application rate to achieve the same retention as an SC (Example 5) at the end of the manufacturing process.

Examples 8-15

Suspension concentrates and large particle suspensions comprising triadimefon or cyproconazole were prepared as described above for Examples 1-4 using the following ingredients and concentrations.

TABLE 3

Composition and particle size of Examples 8-15

| | Example | | | | | | | |
|---|---|---|---|---|---|---|---|---|
| | 8 | 9 | 10 | 11 | 12 | 13 | 14 | 15 |
| Biocide | Triadimefon | | | | Cyproconazole | | | |
| Active (g/L) | 210 | | | | 210 | | | |
| Disp/wetters (g/L) | 19.8 | | | | 19.8 | | | |
| Mg Al silicate (g/L) | 6.0 | | | | 6.0 | | | |
| Preservatives (g/L) | 0.37 | | | | 0.37 | | | |
| Gensil 2000 (g/L) | 0.8 | | | | 0.8 | | | |
| Xanthan gum (g/L) | 1.5 | | | | 1.5 | | | |
| Formulation type | SC | Large particle suspension | | | SC | Large particle suspension | | |
| D [4, 3] (µm) | 8.03 | 22.4 | 39.2 | 64.2 | 4.33 | 21.5 | 45.6 | 57.1 |
| Dv90 (µm) | 11.0 | 43.2 | 108 | 169 | 7.61 | 45.2 | 95.9 | 121 |

Examples 8 and 12 relate to compositions containing particles with a particle size typical of a suspension concentrate wherein the D [4,3] was 8.03 µm and 4.33 µm, respectively. Examples 9-12 and 13-15 contained particles with a particle size larger than a suspension concentrate (Table 3).

Examples 8-15 were each combined with Prefer® PF resin and used to make glueline-treated plywood as described above and using a biocide application rate of 250 gai/m³. Plywood was also prepared using Examples 11 and 15 applied together, each at 250 gai/m³. Plywood samples were ground to pass through a 3 mm screen and triadimefon and cyproconazole retention analyses were performed by GC as described in Methods.

Recoveries of triadimefon and cyproconazole after hot press treatment alone progressively increased when moving from a suspension concentrate (Examples 8 and 12) to suspensions of larger particles (Examples 9-11 and 13-15, FIGS. 3 and 4). Significant improvements were achieved at D [4,3] values of about 21.5 µm and above. More importantly, the triadimefon and cyproconazole recoveries after hot pressing and simulated block stacking (72 h at 100° C.) increased progressively when moving from a formulation comprising a suspension concentrate to suspensions containing the large particles of triadimefon and cyproconazole (FIGS. 3 and 4). Similar improvements after hot pressing and after hot pressing and block stacking (72 h at 100° C.) were achieved when large particle suspensions of triadimefon and cyproconazole were combined and applied together (Examples 11 and 15) as a glueline treatment (FIG. 5).

Use of a triadimefon and cyproconazole large particle suspensions (Examples 9-11 and 13-15) would enable a significant reduction in the triadimefon and cyproconazole application rates to achieve the same retentions as SCs (Examples 8 and 12) at the end of the manufacturing process.

Examples 16-23

Further suspension concentrates and large particle suspensions were prepared using azoxystrobin, flutolanil and pyrimethanil as described above for Examples 1-4 using the following ingredients and concentrations.

TABLE 4

Composition and particle size of Examples 16-23

|  | Example |  |  |  |  |  |  |  |
| --- | --- | --- | --- | --- | --- | --- | --- | --- |
|  | 16 | 17 | 18 | 19 | 20 | 21 | 22 | 23 |
| Biocide | Pyrimethanil |  |  |  | Azoxystrobin |  | Flutolanil |  |
| Active (g/L) | 150 |  |  |  | 210 |  | 150 |  |
| Disp/wetters (g/L) | 21.9 |  |  |  | 21.9 |  | 21.9 |  |
| Mg Al silicate (g/L) | 6.4 |  |  |  | 6 |  | 6.4 |  |
| Preservatives (g/L) | 0.37 |  |  |  | 0.37 |  | 0.37 |  |
| Gensil 2000 (g/L) | 0.8 |  |  |  | 0.8 |  | 0.8 |  |
| Xanthan gum (g/L) | 1.5 |  |  |  | 1.5 |  | 1.5 |  |
| Formulation type | SC | Large particle (LP) |  |  | SC | LP | SC | LP |
| D [4, 3] (µm) | 4.67 | 19.3 | 37.8 | 70.7 | 8.28 | 19.0 | 7.47 | 26.0 |
| Dv90 (µm) | 8.40 | 37.1 | 80.6 | 155 | 9.36 | 38.8 | 15.0 | 53.9 |

Examples 16, 20 and 22 relate to compositions containing pyrimethanil, azoxystrobin, and flutolanil particles with a particle size typical of a suspension concentrate, whereas Examples 17-19, 21 and 23 relate to compositions containing particles with a particle size larger than a suspension concentrate with D [4,3] values as shown in Table 4.

Glueline-treated plywood was prepared with Examples 16-23 using an application rate of 250 gai/m³ in each case. To determine azoxystrobin, pyrimethanil and flutolanil retentions, plywood samples were ground to pass through a 3 mm screen and analysed as described in Methods.

Improvements in pyrimethanil recoveries were achieved both after hot pressing and after hot pressing and simulated block stacking by increasing the particle size D [4,3] of the pyrimethanil active ingredient (Examples 17-19) above that of a suspension concentrate (Example 16, FIG. 6). Substantial improvements in recoveries of azoxystrobin and flutolanil were also achieved both after hot pressing and after hot pressing and block stacking by increasing the D [4,3] from that of a suspension concentrate (Examples 20 and 22) to a D [4,3] of 19.0 µm (Example 21) and 26.0 µm (Example 23), respectively (FIG. 7).

Use of pyrimethanil, azoxystrobin and flutolanil large particle suspensions would enable a significant reduction in application rates to achieve the same retentions as their suspension concentrate counterparts at the end of the manufacturing process.

Examples 24 and 25

Example 24 was a commercial 200 g/L fipronil suspension concentrate (Kalas®). Example 25 was an analogous large particle suspension of fipronil and was prepared as described above using the following ingredients and concentrations: 109.7 g fipronil technical, 19.3 g of dispersants and wetting agents, 3.58 g magnesium aluminium silicate, 0.32 g of preservatives, 0.26 g antifoam, 2.62 g xanthan gum, 17.4 g of glycerol, 15.8 g of propylene glycol and water to 527 ml. The ingredients were stirred gently to produce a homogeneous suspension.

Example 25 contained larger fipronil particles than Example 25, a commercially available fipronil suspension concentrate (Table 5).

TABLE 5

Particle size of Examples 24 and 25 and fipronil recoveries in hot pressed and hot pressed and block stacked plywood.

|  | Example | |
| --- | --- | --- |
|  | 24 (Kalas ®) | 25 |
| Formulation type | SC | Large particle suspension |
| D [4, 3] (µm) | 5.84 | 30.0 |
| Dv90 (µm) | 11.9 | 72.2 |

TABLE 5-continued

Particle size of Examples 24 and 25 and fipronil recoveries in hot pressed and hot pressed and block stacked plywood.

| | Example | |
|---|---|---|
| | 24 (Kalas ®) | 25 |
| Fipronil recovery after hot pressing | 22.5% | 38.4% |
| Fipronil recovery after hot pressing and block stacking (72 h at 100° C.) | 18.0% | 36.0% |

Plywood was manufactured from glue supplemented with Examples 24 and 25 at a fipronil application rate of 200 gai/m$^3$. The plywood was manufactured as described for Examples 1-4 except that the dimension of the veneers were 200 mm×200 mm×3.63 mm thick and the fipronil application rate was 200 gai/m$^3$. The 7-ply plywood layup was sawn in half and hot pressed for 12 minutes at 145° C. and approx. 10 MPa. Plywood specimens were ground in a Wiley® mill to pass through a 3 mm screen and fipronil was analysed as described in Methods.

The fipronil recoveries after hot pressing or after hot pressing and block stacking using Example 25 were at least double the recoveries achieved using the commercial suspension concentrate (Example 24, Table 5).

Use of a fipronil large particle suspension (Examples 25) would therefore enable a halving of the fipronil application rates to achieve the same retention as an SC (Example 24) at the end of the manufacturing process.

The invention claimed is:

1. A composition for increasing the retention of a biocide in a glueline-treated glued-wood product that has been hot-pressed and/or block-stacked during manufacture comprising particles of at least one biocide, wherein said particles have a volume mean diameter D [4,3] of greater than about 50 μm and wherein the at least one biocide is selected from the group consisting of imidacloprid, bifenthrin, fipronil, triadimefon, cyproconazole, pyrimethanil, azoxystrobin, and flutolanil.

2. The composition according to claim 1, wherein the particles have a volume weighted percentile Dv90 of about 400 μm or less.

3. The composition according to claim 1, comprising about 1 to 99% of biocide particles by weight, based on the total weight of the composition.

4. The composition according to claim 1, wherein the glueline-treated glued-wood product is selected from engineered wood products, glued-wood veneers, and reconstituted wood-based products.

5. The composition according to claim 1, wherein the composition is formulated suitable for glue addition.

6. The composition according to claim 1, wherein the particles have a volume mean diameter D [4,3] less than about 114 μm.

7. The composition according to claim 1, wherein the retention of a biocide is increased in the range of about 4% to about 65% of nominal loading.

8. A glueline-treated glued-wood product comprising the composition according to claim 1.

9. A glueline-treated glued-wood product manufactured according to a method for increasing the retention of a biocide in a glueline-treated glued-wood product that has been hot-pressed and/or block-stacked during manufacture comprising applying a composition according to claim 1 to the glueline during the production of said product.

10. A glue for producing a glueline-treated glued-wood product comprising the composition according to claim 1.

11. The glue according to claim 10, wherein the glue is selected from phenolic resins, amino resins, isocyanate resins thermoset epoxy resins, polyurethane resins, polyvinyl acetates (PVAs), and adhesives based on biomaterials;
wherein the phenolic resins are selected from the group consisting of novolac-type phenol-formaldehyde resins (PF), resole-type PF resins, resorcinol-formaldehyde resins and phenol-resorcinol-formaldehyde resins;
wherein the amino resins are selected from the group consisting of hydroxymethyl derivatives of urea, alkoxymethyl derivatives of urea, melamine, benzoguanamine, glycoluril, urea-formaldehyde, melamine-formaldehyde, and melamine-urea formaldehyde resins;
wherein the isocyanate resins are selected from the group consisting of isocyanate resins based on polymerised diisocyanates, isocyanate resins based on partially polymerised diisocyanates, and polymeric diphenylmethane diisocyanate (pMDI); and
wherein the adhesives based on biomaterials are selected from proteins, starches, lignocellulosic extractives, and lignins.

12. A method for increasing the retention of a biocide in a glueline-treated glued-wood product that has been hot-pressed and/or block-stacked during manufacture comprising applying a composition according to claim 1 to the glueline during the production of said product.

13. The method according to claim 12, wherein the glued-wood product is selected from engineered wood products, glued-wood veneers, plywood, laminated veneer lumber (LVL), reconstituted wood-based products, glued-wood flakes, chips, strands, particles, fibres, flour, dusts and nanofibrils, flakeboard, chipboard, strandboard, oriented strand board (OSB), parallel strand lumber, particleboard, medium density fiberboard (MDF), high density fibreboard and hardboard.

14. The method according to claim 12, wherein the glue is selected from phenolic resins amino resins, isocyanate resins, thermoset epoxy resins, polyurethane resins, polyvinyl acetates (PVAs), and adhesives based on biomaterials;
wherein the phenolic resins are selected from the group consisting of novolac-type phenol-formaldehyde resins (PF), resole-type PF resins, resorcinol-formaldehyde resins and phenol-resorcinol-formaldehyde resins;
wherein the amino resins are selected from the group consisting of hydroxymethyl derivatives of urea, alkoxymethyl derivatives of urea, melamine, benzoguanamine, glycoluril, urea-formaldehyde, melamine-formaldehyde, and melamine-urea formaldehyde resins;
wherein the isocyanate resins are selected from the group consisting of isocyanate resins based on polymerised diisocyanates, isocyanate resins based on partially polymerised diisocyanates, and polymeric diphenylmethane diisocyanate (pMDI); and wherein the adhesives based on biomaterials are selected from proteins, starches, lignocellulosic extractives, and lignins.

15. The method according to claim 12, wherein applying the composition to the glueline during the production of the product comprises blending said composition directly into the glue at any time from glue production to use during manufacture of the glued-wood product.

16. The method according to claim 12, wherein applying the composition to the glueline during the production of the product comprises applying the composition indirectly to the glue by applying the composition to the wood component prior to, at the same time as, or after introduction of the glue during manufacture of the glued-wood product.

17. A method of increasing retention of a biocide in a glued-wood product comprising a glue or native resin, comprising the composition according to claim 1, wherein the glued-wood product has been (i) hot-pressed, or (ii) hot-pressed and block-stacked during manufacture, and wherein the composition is applied to the glue or the native resin during manufacture.

* * * * *